United States Patent
Hashimoto et al.

(10) Patent No.: US 8,717,003 B2
(45) Date of Patent: May 6, 2014

(54) VOLTAGE REGULATOR CIRCUIT INCLUDING PULSE GENERATORS

(75) Inventors: Tetsutaro Hashimoto, Kawasaki (JP); Tetsuyoshi Shiota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 12/833,701

(22) Filed: Jul. 9, 2010

(65) Prior Publication Data

US 2011/0006606 A1 Jan. 13, 2011

(30) Foreign Application Priority Data

Jul. 10, 2009 (JP) ................................. 2009-163907
Nov. 24, 2009 (JP) ................................. 2009-266309

(51) Int. Cl.
*G05F 1/00* (2006.01)

(52) U.S. Cl.
USPC ............................. 323/289; 323/280; 323/284

(58) Field of Classification Search
USPC ........................................ 323/280, 284, 289
See application file for complete search history.

(56) References Cited

U.S. PATENT DOCUMENTS

| | | | |
|---|---|---|---|
| 4,455,526 A * | 6/1984 | Miller | 323/282 |
| 4,952,863 A | 8/1990 | Sartwell et al. | |
| 5,992,536 A | 11/1999 | Shimada et al. | |
| 6,545,452 B2 * | 4/2003 | Bruckmann et al. | 323/289 |
| 7,315,198 B2 * | 1/2008 | Park et al. | 327/541 |
| 7,453,244 B1 * | 11/2008 | Doyle | 323/280 |
| 7,564,232 B2 * | 7/2009 | Lee | 323/284 |
| 8,044,647 B2 * | 10/2011 | Kang | 323/280 |
| 8,080,988 B2 * | 12/2011 | Hurtz et al. | 323/289 |
| 8,258,852 B2 * | 9/2012 | Leung et al. | 327/390 |
| 2001/0054921 A1 | 12/2001 | Akiyoshi | |
| 2002/0031032 A1 | 3/2002 | Ooishi | |
| 2003/0020439 A1 * | 1/2003 | Engl | 323/280 |
| 2005/0035745 A1 * | 2/2005 | Kinugawa et al. | 323/210 |
| 2005/0068092 A1 | 3/2005 | Sano | |
| 2005/0127885 A1 * | 6/2005 | Jung | 323/282 |
| 2007/0145922 A1 | 6/2007 | Ito et al. | |
| 2007/0159146 A1 * | 7/2007 | Mandal | 323/280 |
| 2007/0210780 A1 * | 9/2007 | Kataoka | 323/285 |

FOREIGN PATENT DOCUMENTS

| | | |
|---|---|---|
| JP | 09-323199 B | 12/1997 |
| JP | 2002-009601 A | 1/2002 |

(Continued)

OTHER PUBLICATIONS

Japanese Office Action dated Oct. 1, 2013, Japanese Application No. 2009-266309, 4 pages.

*Primary Examiner* — Adolf Berhane
*Assistant Examiner* — Gary Nash
(74) *Attorney, Agent, or Firm* — Arent Fox LLP

(57) ABSTRACT

A voltage regulator circuit includes: a first pulse generator configured to output a pulse whose level remains unchanged when an input signal of a first circuit is in a first period, and whose level changes from a second level to a first level when an edge of the input signal of the first circuit is detected after the first period; a second pulse generator configured to output a pulse from a time that the pulse output by the first pulse generator becomes the first level until a second period elapses; a first field-effect transistor having a source connected to a power supply potential node, and a drain connected to a power supply potential terminal of the first circuit; and a first switch configured to cause a potential at a gate of the first field-effect transistor to be a first potential.

17 Claims, 33 Drawing Sheets

(56) References Cited

FOREIGN PATENT DOCUMENTS

| | | |
|---|---|---|
| JP | 2005-039334 A | 2/2005 |
| JP | 2005-107948 A | 4/2005 |
| JP | 2005-310060 A | 11/2005 |
| JP | 2005-316784 A | 11/2005 |
| JP | 2006-203248 A | 8/2006 |
| JP | 2007-179345 A | 7/2007 |

* cited by examiner

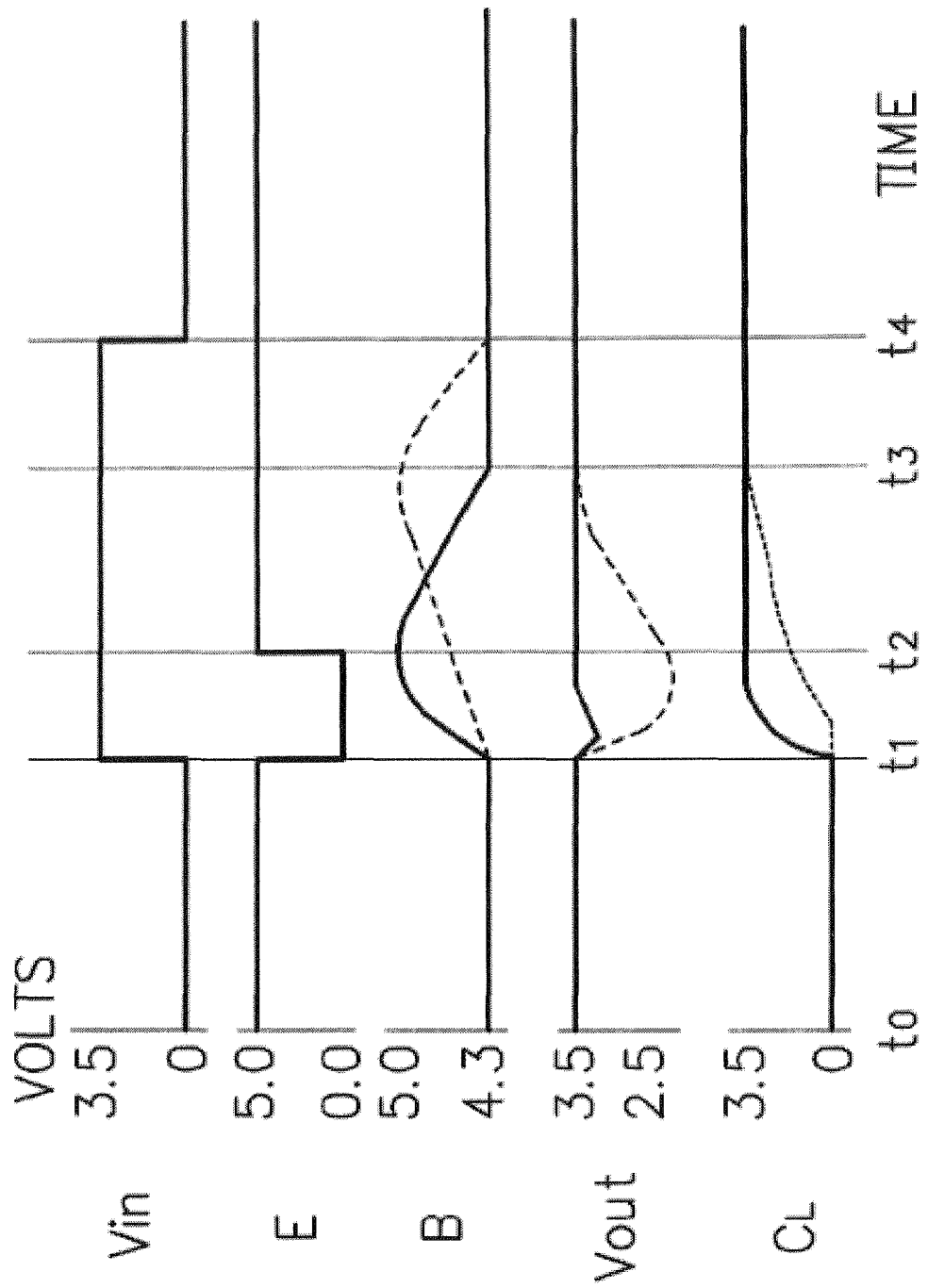

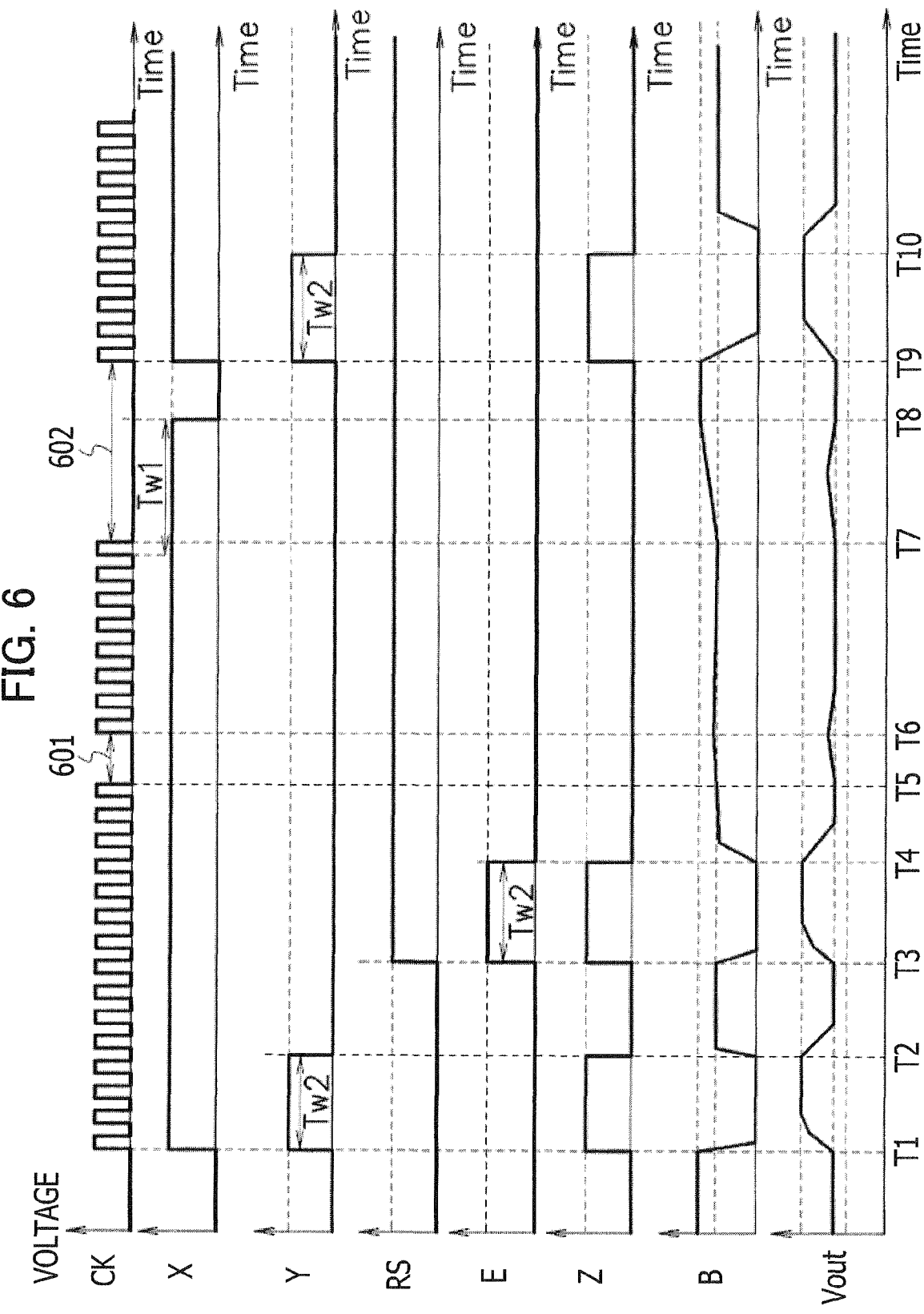

VOLTAGE REGULATOR CIRCUIT INCLUDING PULSE GENERATORS

CROSS-REFERENCE TO RELATED APPLICATIONS

This application is based upon and claims the benefit of priority of the prior Japanese Patent Application No. 2009-163907, filed on Jul. 10, 2009, and the prior Japanese Patent Application No. 2009-266309, filed on Nov. 24, 2009, the entire contents of which are incorporated herein by reference.

FIELD

Aspects in accordance with the present invention relate to a voltage regulator circuit.

BACKGROUND

In recent years, the market has demanded reduced power consumption of semiconductor circuits in order to increase battery duration in mobile devices and to reduce the costs of heat dissipation parts of semiconductor devices. To reduce the power consumption of semiconductor circuits, it is desirable for semiconductor circuits to be operated at as low a power supply voltage as possible. For example, in a semiconductor circuit including a processor core and a peripheral circuit, different power supply voltages may be supplied to the processor core and the peripheral circuit. For example, 1.2 V may be supplied to the processor core, and 0.8 V may be supplied to the peripheral circuit. Generally, the output of a voltage regulator circuit is used as a power supply to be supplied to each circuit.

The output voltage of the voltage regulator circuit is preferably independent of the output current. For example, even when the current consumed by the processor core changes from 0 A to 1 A, it is preferable that the output voltage of the voltage regulator circuit remains at 1.2 V. However, the output voltage of the voltage regulator circuit generates a potential difference by using an output transistor resistance component, and it takes certain time to perform control thereof. A voltage drop occurs due to the resistance component when the output current suddenly increases in an amount of time shorter than the control time, resulting in drop of the output voltage. Because voltage drop causes the semiconductor circuit to malfunction, it is desired to avoid such voltage drop.

FIG. 1A is a diagram illustrating an example of a voltage regulator circuit. FIG. 1B is a timing chart illustrating the operation of the voltage regulator circuit (e.g., see the specification of U.S. Pat. No. 4,952,863). The voltage regulator circuit includes a differential amplifier 10, a driver circuit 12, a delay circuit 14, a monostable multivibrator circuit 16, transistors T6 and T11 to T13, and a capacitor CL. The differential amplifier 10 includes transistors T1 to T5. The driver circuit 12 includes transistors T7 to T10.

To suppress a drop of an output voltage Vout in response to a sudden increase in the output current, the voltage regulator circuit suddenly reduces the resistance of the output transistor T6 using a signal obtained by causing an input signal Vin of the driver circuit 12, which is a voltage supply destination, to go through the monostable multivibrator circuit 16. As illustrated in FIG. 1B, a pulse for a certain period is generated at node E in response to a rising edge of the input signal Vin, and the n-channel output transistor T6 is turned ON typically during that period in which the pulse is being generated. The output voltage Vout is supplied as a power supply voltage of the driver circuit 12. Without the transistor T13, after time t1, the output current suddenly increases, and the output voltage Vout decreases (broken line). The transistor T13 has the effect of suppressing drop of the output voltage Vout (solid line).

The technique for controlling a dummy load in accordance with the operation mode of a circuit is known (e.g., see Japanese Unexamined Patent Application Publication No. 2005-310060). This technique performs control so that an output current value does not suddenly increase by gradually changing the magnitude of the dummy load when the circuit changes from a sleep state to an active state.

Most of the current consumed by the processor core is consumed by a clock signal. The current consumption increases most when the state changes from a state where the input clock signal is stopped to a state where the input clock signal is activated. Activation of the clock signal corresponds to a state where a repetitive pulse signal is input to the clock signal.

FIG. 2 is a timing chart illustrating the operation when the clock signal is input as the input signal Vin to the voltage regulator circuit illustrated in FIG. 1A. In this operation, it is assumed that the clock signal is input as the input signal Vin. While the clock signal Vin is being supplied, the output voltage Vout always increases up to a power supply voltage Vcc, and a desired minimum voltage level may not be maintained. Therefore, the voltage regulator circuit uselessly consumes power.

It takes time for the voltage regulator circuit to gradually change the dummy load when the method described in Japanese Unexamined Patent Application Publication No. 2005-310060 is used. A processor circuit that promptly consumes current after the clock signal is input might not cope with an increase in current.

SUMMARY

Aspects include a voltage regulator circuit having: a first pulse generator configured to output a pulse whose level remains unchanged when an input signal of a first circuit is in a first period, and whose level changes from a second level to a first level when an edge of the input signal of the first circuit is detected after the first period; a second pulse generator configured to output a pulse from when the pulse output by the first pulse generator becomes the first level to when a second period elapses; a first field-effect transistor having a source connected to a power supply potential node, and a drain connected to a power supply potential terminal of the first circuit; and a first switch configured to cause a potential at a gate of the first field-effect transistor to be a first potential, based on the pulse output by the second pulse generator, the pulse serving as a control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B is a timing chart illustrating the operation of the voltage regulator circuit illustrated in FIG. 1A;

FIG. 6 is a timing chart illustrating an example of the operation of the voltage regulator circuit illustrated in FIG. 5 in accordance with aspects of the present invention;

DETAILED DESCRIPTION

First Exemplary Implementation

Figure 3:
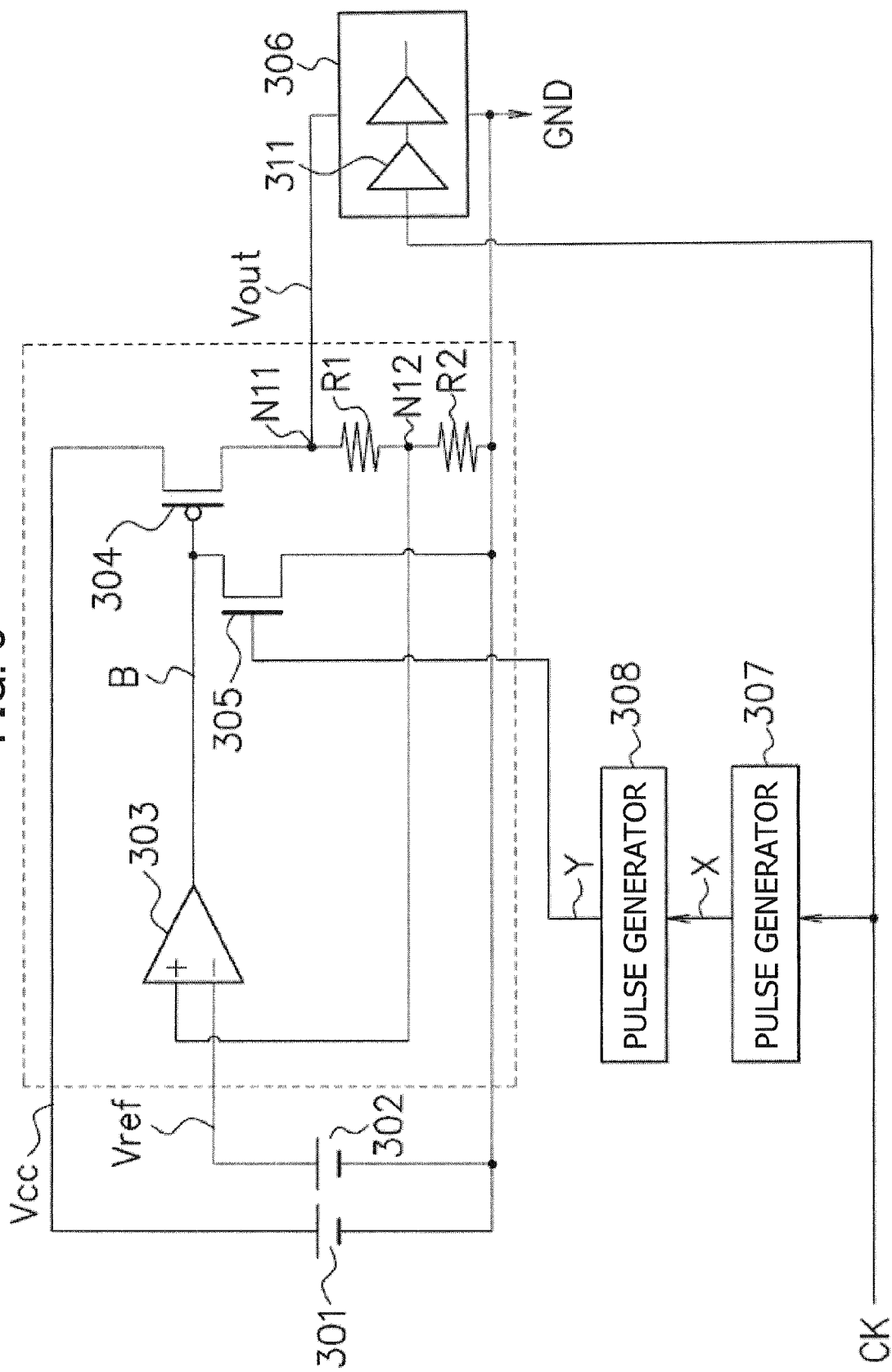
FIG. 3 is a diagram illustrating an example of a voltage regulator circuit according to a first exemplary implementation in accordance with aspects of the present invention.
Figure 4:
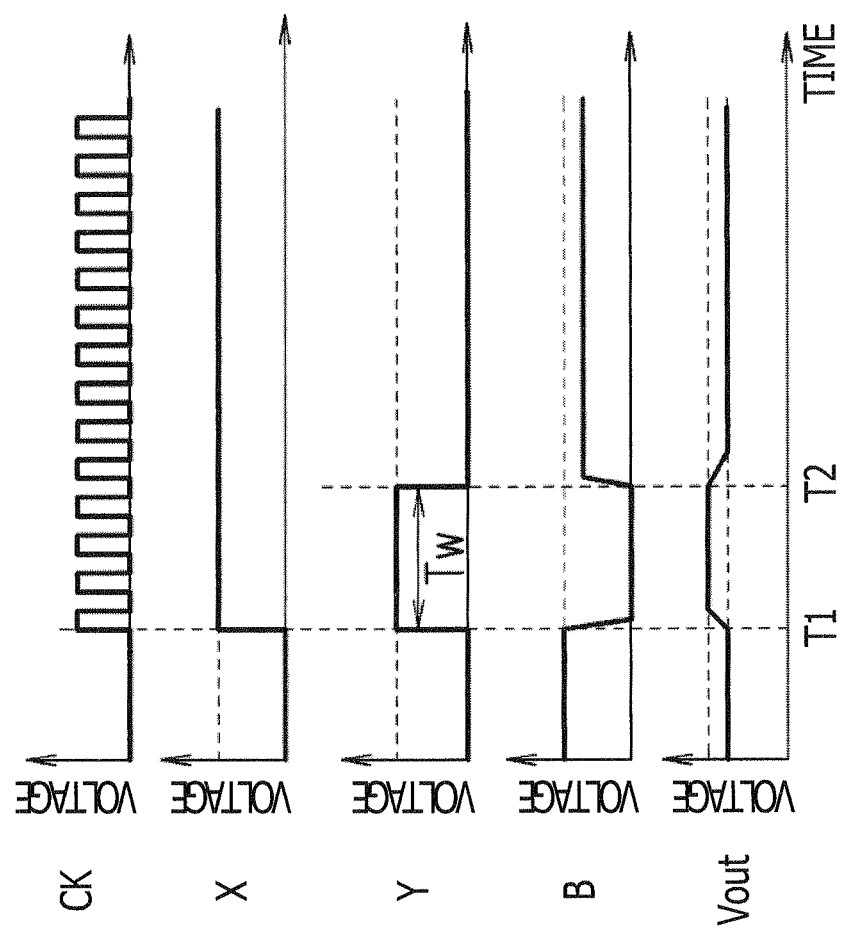
FIG. 4 is a timing chart illustrating an example of the operation of the voltage regulator circuit illustrated in FIG. 3 in accordance with aspects of the present invention.

FIG. 3 is a diagram illustrating an example of a voltage regulator circuit according to a first exemplary implementation in accordance with aspects of the present invention. FIG. 4 is a timing chart illustrating an example of the operation of the voltage regulator circuit illustrated in FIG. 3. The voltage regulator circuit includes direct current (DC) power sources 301 and 302, an error amplifier 303, a first field-effect transistor (FET) 304, a second FET (first switch) 305, a first pulse generator 307, a second pulse generator 308, and resistors R1 and R2.

A first semiconductor circuit 306 includes, for example, a buffer 311. An output voltage Vout is input to a power supply potential terminal of the first semiconductor circuit 306, and a reference potential (ground potential) GND is input to a reference potential terminal of the first semiconductor circuit 306. The first semiconductor circuit 306 operates in response to an input signal CK input thereto. For example, the first semiconductor circuit 306 includes a processor core or a peripheral circuit, and an output voltage Vout of 1.2 V or 0.8 V is supplied to the first semiconductor circuit 306. The voltage regulator circuit generates the output voltage Vout by reducing a power supply potential Vcc and supplies the output voltage Vout as a power supply voltage to the first semiconductor circuit 306. When a clock signal is input as the input signal CK to the first semiconductor circuit 306, the current consumption of the first semiconductor circuit 306 increases at input start time T1 at which the inputting of the clock signal CK is started, thereby causing the output voltage Vout to decrease. In this exemplary implementation, useless power consumption is avoided by increasing a drain voltage Vout of the first FET 304 at the clock signal input start time, thereby supplying a stable power supply potential.

The DC power source 301 has two ends. One end is connected to a node at the reference potential GND, and the other end outputs the power supply potential Vcc. The DC power source 302 has two ends. One end is connected to the node at the reference potential GND, and the other end outputs a reference voltage Vref.

The first pulse generator 307 outputs a pulse X that maintains a high level (first level) when the edge of the input signal CK of the first semiconductor circuit 306 is detected and that maintains a low level (second level) when no edge is detected within a first period thereafter. The second pulse generator 308 outputs a pulse Y at a high level from when the pulse X output by the first pulse generator 307 becomes a high level (first level) to when a second period Tw elapses.

The second FET 305 is an n-channel FET. The second FET 305 receives, at the gate thereof, the pulse Y output by the second pulse generator 308 as a control signal. The source of the second FET 305 is connected to a reference potential node (first potential node). The gate of the first FET 304 is connected to the drain of the second FET 305. The source of the first FET 304 is connected to a node at the power supply potential Vcc. The drain of the first FET 304 is connected to the power supply potential terminal of the first semiconductor circuit 306.

A node N11 is connected to the drain of the first FET 304. The resistor R1 is connected between the node N11 and a node N12. The resistor R2 is connected between the node N12 and the node at the reference potential GND. A positive input terminal of the error amplifier 303 is connected to the node N12. A negative input terminal of the error amplifier 303 is connected to a node at the reference voltage Vref. An output terminal of the error amplifier 303 is connected to the gate of the first FET 304.

The resistors R1 and R2 are resistors for resistance-dividing the drain voltage Vout of the first FET 304. The error amplifier 303 outputs a differential voltage between a voltage at the node N12, which is obtained as a result of voltage division by using the resistors R1 and R2, and the reference voltage Vref to the gate of the first FET 304.

The positive input terminal of the error amplifier 303 may be connected to the node N11. The error amplifier 303 outputs a differential voltage between the drain voltage Vout of the first FET 304 or the voltage at the node N12 in accordance with the drain voltage Vout and the reference voltage Vref to the gate of the first FET 304.

An output voltage B of the error amplifier 303 drops when the voltage at the node N12 becomes lower than the reference voltage Vref, thereby turning ON the first FET 304 and increasing the output voltage Vout. In contrast, when the voltage at the node N12 becomes higher than the reference voltage Vref, the output voltage B of the error amplifier 303 increases, thereby turning OFF the first FET 304 and reducing the output voltage Vout. Accordingly, the output voltage Vout may be maintained at a certain desired voltage. The voltage regulator circuit generates the output voltage Vout by reducing the power supply potential Vcc.

At time T1 at which the inputting of the clock signal serving as the input signal CK is started, the current consumption of the first semiconductor circuit 306 increases. The error amplifier 303 may not follow this increase, thereby reducing the output voltage Vout. Drop of the output voltage Vout is avoided by providing the pulse generators 307 and 308 and the second FET 305.

The first pulse generator 307 outputs the pulse X, which maintains a high level when the edge of the input signal CK of the first semiconductor circuit 306 is detected and which maintains a low level when no edge is detected within the first period thereafter. That is, the pulse X maintains a high level while the clock signal serving as the input signal CK is being input and maintains a low level after the inputting of the clock signal serving as the input signal CK ends. The second pulse generator 308 outputs the pulse Y at a high level from when the pulse X output by the first pulse generator 307 becomes a high level to when the second period Tw elapses.

The n-channel FET 305 is turned ON when the pulse Y becomes a high level at time T1, and the voltage B becomes a low level (reference potential). Then, the p-channel FET 304 is turned ON, and the output voltage Vout increases up to the power supply potential Vcc and maintains itself as the power supply potential Vcc. Accordingly, drop of the output voltage Vout may be avoided even when the current consumption of the first semiconductor circuit 306 increases.

Figure 1A:
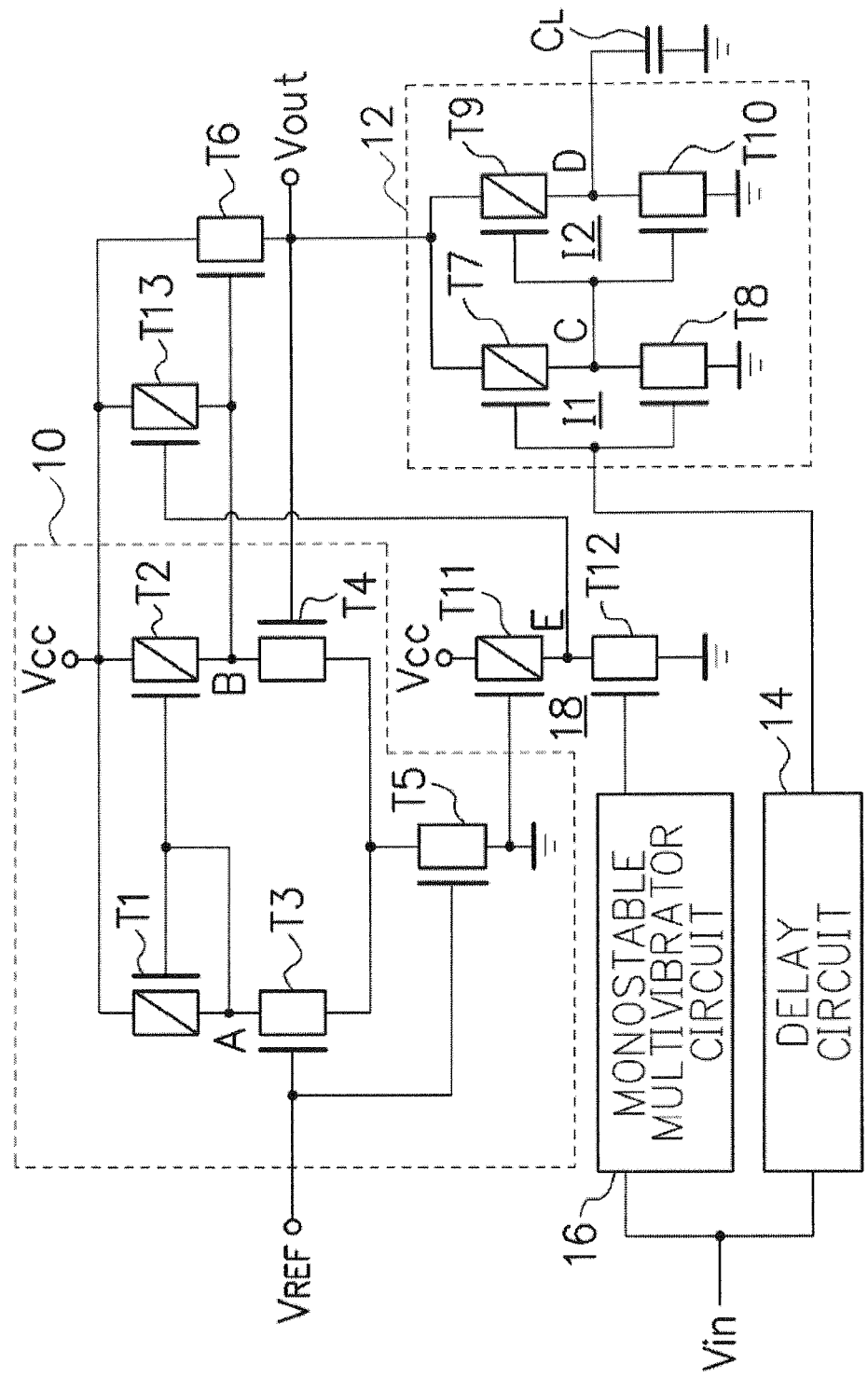
FIG. 1A is a diagram illustrating an example of a voltage regulator circuit.
Figure 2:
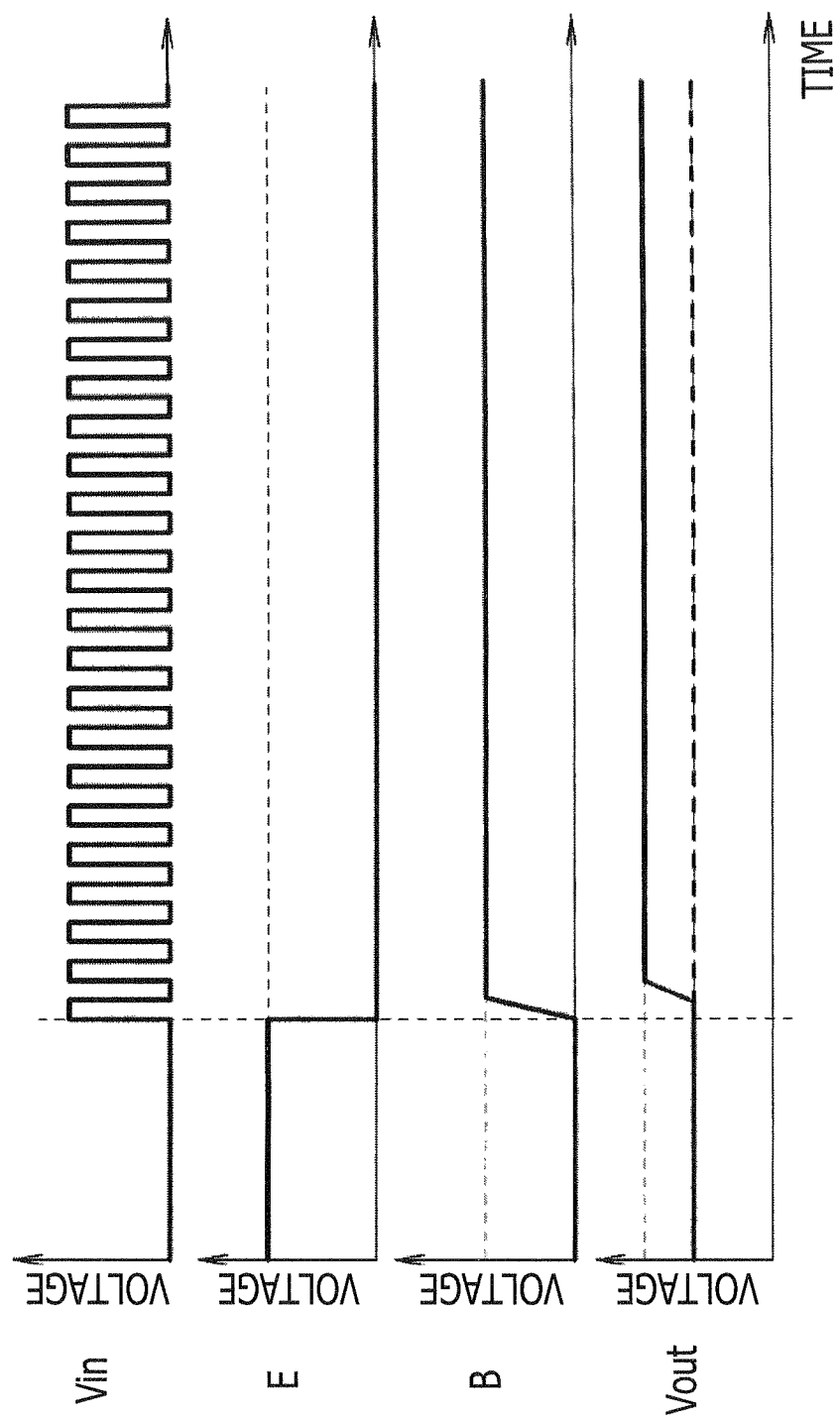
FIG. 2 is a timing chart illustrating an operation when a clock signal is input as an input signal to the voltage regulator circuit illustrated in FIG. 1A.

Next, when the pulse Y becomes a low level at time T2, the n-channel FET 305 is turned OFF, and the voltage B becomes the output voltage of the error amplifier 303. Then, the p-channel FET 304 operates in accordance with the gate voltage B, and the output voltage Vout is maintained at a certain voltage lower than the power supply potential Vcc. After time T2, the output voltage Vout may be maintained at a certain desired voltage owing to the operation of the error amplifier 303. In FIG. 2, power is uselessly consumed since the output voltage Vout is maintained at the power supply potential Vcc while the clock signal is being input.

In this exemplary implementation, when the clock signal is input as the input signal CK, the drain voltage Vout of the p-channel FET 304 is typically increased at the time at which the inputting of the clock signal CK is started. Therefore, useless power consumption may be avoided, and a stable power supply potential may be supplied.

As described above, the output pulse X of the first pulse generator 307 becomes a high level at time T1 at which the clock signal is input. This causes the output pulse Y of the second pulse generator 308 to also become a high level. In response to this, the gate voltage B of the p-channel FET 304 suddenly changes to a low level, and the resistance between the source and the drain of the p-channel FET 304 suddenly decreases. Accordingly, the output voltage Vout increases up to the power supply potential Vcc. Thereafter, the pulse Y returns to a low level after the certain time Tw elapses, even while the clock signal is continuously input. Thus, the gate voltage B of the p-channel FET 304 becomes substantially the same voltage as the output voltage of the error amplifier 303. Accordingly, the output voltage Vout drops to a target voltage owing to the error amplifier 303 and maintains itself as the target voltage.

According to this exemplary implementation, after time T2 at which the certain time Tw has elapsed, the output voltage Vout is not fixed to the power supply potential Vcc, and the output voltage Vout drops to the target voltage. Accordingly, the total power consumption of the first semiconductor circuit 306 and the voltage regulator circuit may be reduced by approximately 30%. Also, the mounting costs and areas become unnecessary since large capacitors outside the first semiconductor circuit 306 become unnecessary.

Second Exemplary Implementation

Figure 5:
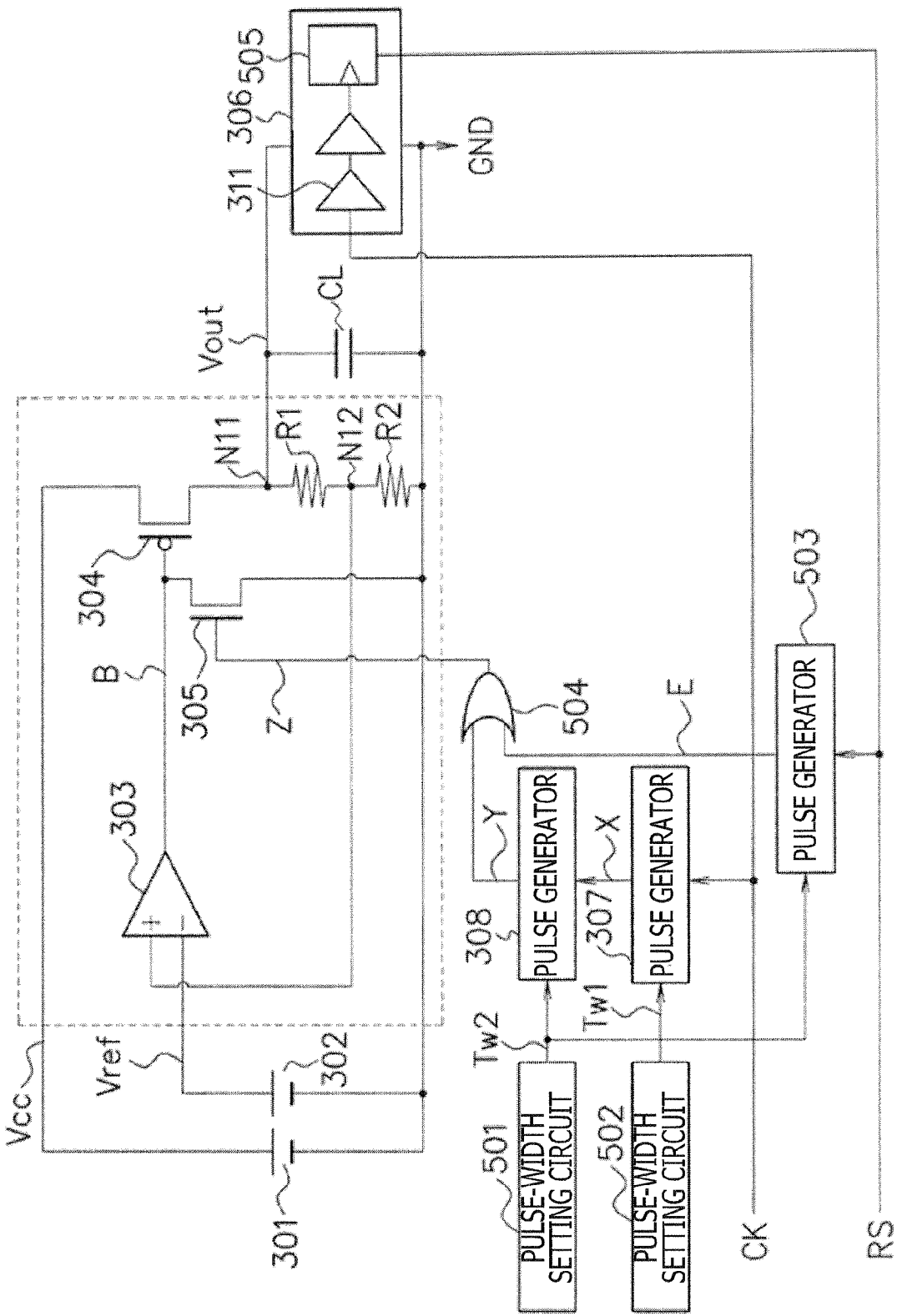
FIG. 5 is a diagram illustrating an example of a voltage regulator circuit according to a second exemplary implementation in accordance with aspects of the present invention.

FIG. 5 is a diagram illustrating an example of the configuration of a voltage regulator circuit according to a second exemplary implementation in accordance with aspects of the present invention. FIG. 6 is a timing chart illustrating an example of the operation of the voltage regulator circuit illustrated in FIG. 5. The circuit illustrated in FIG. 5 is obtained by adding pulse-width setting circuits 501 and 502, a third pulse generator 503, an OR circuit 504, a flip-flop 505, and a capacitor CL to the circuit illustrated in FIG. 3. Hereinafter, points of the second exemplary implementation that are different from the first exemplary implementation will be described.

The first semiconductor circuit 306 includes the flip-flop 505 in addition to the buffer 311. The flip-flop 505 receives, as an input, an output signal of the buffer 311 and, when a reset signal RS becomes a high level, cancels the resetting. Current consumption of the flip-flop 505 and circuits at subsequent stages increases when the resetting of the flip-flop 505 is cancelled, and the output voltage Vout decreases. Therefore, drop of the output voltage Vout, when the reset signal RS changes, is avoided by providing the third pulse generator 503 and the OR circuit 504.

The capacitor CL is a capacitor for stabilizing the output voltage Vout and is connected between the node N11 and the node at the reference potential GND. The pulse-width setting circuit 501 outputs a set pulse width Tw2. The pulse-width setting circuit 502 outputs a set pulse width Tw1. In accordance with the pulse width Tw1 output from the pulse-width setting circuit 502, the first pulse generator 307 outputs a pulse X that maintains a high level when the edge of the input signal CK of the first semiconductor circuit 306 is detected and that maintains a low level when no edge is detected within a period of the pulse width Tw1 thereafter. Clock stopped periods 601 and 602 are periods when the clock signal serving as the input signal CK is stopped. The clock stopped period 601 corresponds to a period from time T5 to time T6 and is shorter than the period of the pulse width Tw1. Thus, the pulse X maintains a high level. In contrast, the clock stopped period 602 corresponds to a period from time T7 to time T9 and is longer than the period of the pulse width Tw1. Thus, the pulse X becomes a low level at time T8 at which the period of pulse width Tw1 elapses since the clock signal is stopped. Thereafter, when the inputting of the clock signal serving as the input signal CK starts at time T9, the pulse X becomes a high level.

In accordance with the pulse width Tw2 output from the pulse-width setting circuit 501, the second pulse generator 308 outputs a pulse Y at a high level from when the pulse X output from the first pulse generator 307 becomes a high level to when a period of the pulse width Tw2 elapses. The pulse Y is at a high level from time T1 to time T2 and from time T9 to time T10 and is at a low level in other periods.

The reset signal RS is at a low level prior to, for example, time T3 and is at a high level subsequent to time T3. In accordance with the pulse width Tw2 output from the pulse-width setting circuit 501, the third pulse generator 503 outputs a pulse E at a high level from the time that the reset signal RS of the first semiconductor circuit 306 becomes a high level until a period of the pulse width Tw2 elapses. The pulse E is at a high level from time T3 to time T4.

The OR circuit 504 outputs a pulse Z obtained by taking the OR of the output pulse Y of the second pulse generator 308 and the output pulse E of the third pulse generator 503. The second FET 305 receives, at the gate thereof, the output pulse Z of the OR circuit 504. That is, the second FET 305 receives, at the gate thereof, the pulse Y output from the second pulse generator 308 and the pulse E output from the third pulse generator 503, and the second FET 305 is turned ON when the pulse Y or E becomes a high level and is turned OFF when the pulses Y and E become a low level. The first FET 304 is turned ON when the pulse Y or E becomes a high level, and the output voltage Vout increases up to the power supply potential Vcc. The operation when the pulse Y is at a high level is substantially the same as that in the first exemplary implementation.

In the second exemplary implementation, when the reset signal RS becomes a high level, the pulse E becomes a high level, thereby turning ON the first FET 304 and increasing the output voltage Vout up to the power supply potential Vcc.

Accordingly, a drop of the output voltage Vout due to an increase in the current consumption of the first semiconductor circuit 306 may be avoided. Also, the pulse E becomes a low level after the pulse width Tw2 elapses, and the output voltage Vout drops to the target voltage. Therefore, useless power consumption may be avoided.

As described above, the second exemplary implementation is obtained by adding, to the first exemplary implementation, the reset signal RS whose power is the greatest next to the clock signal in the first semiconductor circuit 306, the third pulse generator 503 which receives the reset signal RS, the OR circuit 504 which receives the output pulse Y of the second pulse generator 308 and the output pulse E of the third pulse generator 503, the pulse-width setting circuit 502 which controls the pulse width Tw1 of the first pulse generator 307, and the pulse-width setting circuit 501 which controls the pulse width Tw2 of the second pulse generator 308 and the third pulse generator 503. The pulse-width setting circuit 502 is set to Tw1 for at most the time taken for the gate voltage B of the first FET 304 to become stable as a result of control after the output voltage Vout changes as a result of a change in the output current. The pulse-width setting circuit 501 is set to Tw2 for at most the time taken for the output voltage Vout to become, owing to the second FET 305, from the target voltage to the vicinity of the power supply potential Vcc.

Referring to FIG. 6, at an initial state, the input signal CK is at a low level, and the output pulses X, Y, and E of the pulse generators 307, 308, and 503 are at a low level. In this state, the voltage regulator circuit sets the output voltage Vout to the target voltage Vref×(R1+R2)/R2 by maintaining the voltage B so that the voltage Vout×{R2/(R1+R2)} and the reference voltage Vref become equal.

It is assumed that, at time T1, the input signal CK is activated and a continuous clock pulse is input. The first pulse generator 307 detects the rising edge of the input clock signal CK, and causes the output pulse X to become a high level. When the pulse cycle of the input clock signal CK is shorter than the pulse width Tw1, the next input clock signal CK has its rising edge in a state where the pulse X is at a high level. Thus, the pulse X maintains a high level. The second pulse generator 308 detects the rising edge of the pulse X, and causes the pulse Y to become a high level. The pulse Y becomes a low level at time T2, provided that the pulse X does not become a low level for a period of the pulse width Tw2 after time T1. The output pulse E of the third pulse generator 503 remains at a low level when the reset signal RS is at a low level until time T2. Therefore, the pulse Z is at a high level for a period from time T1 to time T2 and returns to a low level at time T2. That is, the second FET 305 is turned ON for a period from time T1 to time T2. Accordingly, the voltage B becomes a low level at time T1, and the output voltage Vout increases so as to be close to the power supply potential Vcc. At time T2, the output voltage Vout starts decreasing so as to be the target voltage Vref×(R1+R2)/R2.

Next, it is assumed that, at time T3, the reset signal RS is cancelled and becomes a high level. The output pulse E of the third pulse generator 503 is at a high level for a period of the pulse width Tw2 and returns to a low level at time T4. Therefore, the pulse Z is a high level for a period from time T3 to time T4, and the output voltage Vout repeats substantially the same operation as that in the period from time T1 to time 12.

Next, it is assumed that the input clock signal CK is temporarily stopped at time T5 and is reactivated at time T6. The pulse X maintains a high level when a period from time T5 to time T6 is shorter than the pulse width Tw1. Thus, the pulse Y does not become a high level. Since the reset signal RS is unchanged, the pulse Z maintains a low level, and the second FET 305 is not turned ON. In this period, because the output current temporarily decreases, the output voltage Vout increases. At time 16, the current consumption again becomes substantially the same as that prior to time 15. However, since this period is shorter than the pulse width Tw1, the output voltage B hardly changes, and the output voltage Vout does not decrease at time T6.

Next, it is assumed that the input clock signal CK is temporarily stopped at time T7 and is reactivated at time T9. A period from time T7 to time T9 is longer than the pulse width Tw1. The pulse X becomes a low level at time T8, which is after the pulse width Tw1 since the last rising edge of the input clock signal CK immediately before time T7. Thereafter, the pulse X again becomes a high level at time T9 at which the input clock signal CK first rises. This rising edge is detected, and the pulse Y is at a high level for a period of the pulse width Tw2. Since the reset signal RS is unchanged, the pulse Z becomes a high level at time T9. Due to drop in the output current because the input clock signal CK is stopped at time T7, the voltage B increases and becomes stable at time T8. That is, the voltage B is in substantially the same state as that prior to time T1. Therefore, the operation from time T9 to time T10 is substantially the same as that in the period from time T1 to time T2.

In this manner, even when the stopping and the activation of the input clock signal CK are repeated, the output voltage Vout does not become less than the target voltage, and the first semiconductor circuit 306 to which the output voltage Vout is supplied operates in a stable manner. Also, the output voltage Vout remains at the target voltage in a clock signal supplying period except for a period in which the second FET 305 is turned ON. Therefore, in the second exemplary implementation, the power of the first semiconductor circuit 306 may be reduced, compared with the case where the potential Vout in the vicinity of the power supply potential Vcc is constantly output.

Figure 7A:
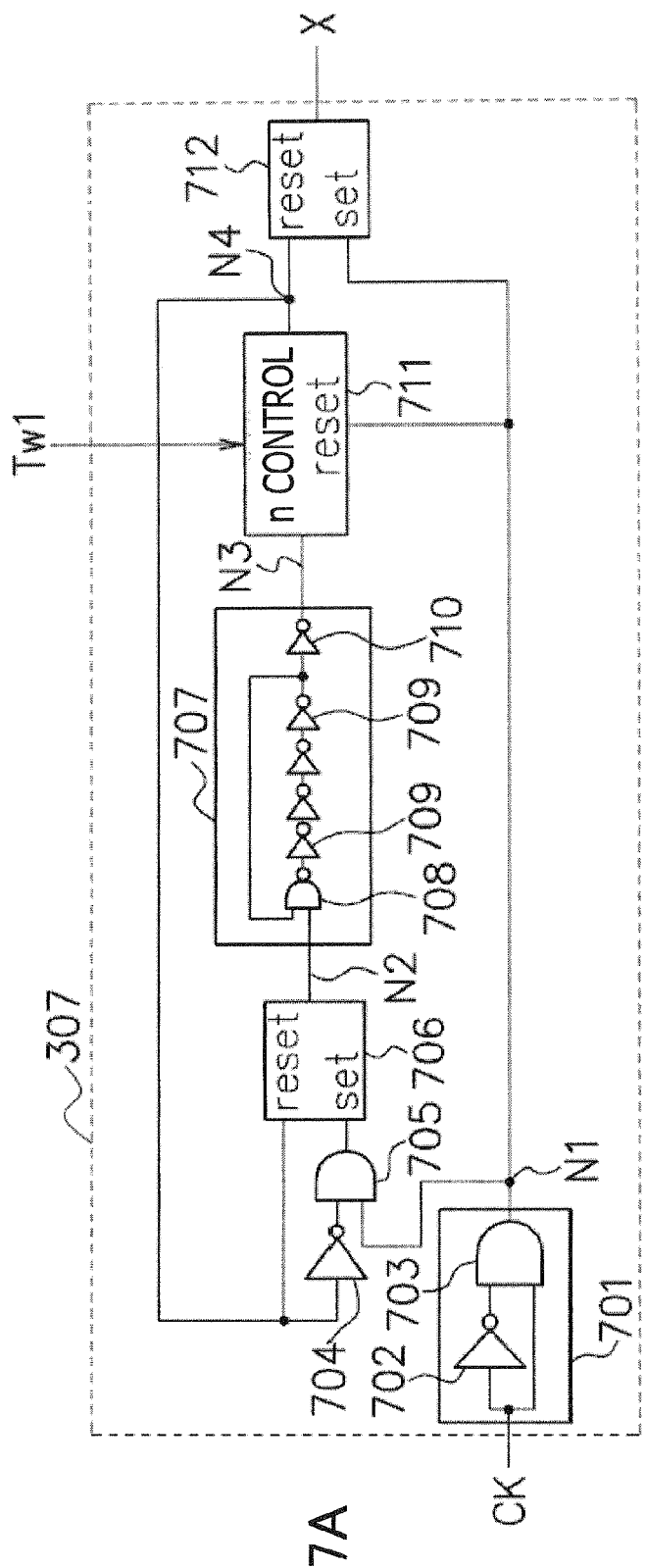
FIG. 7A is a diagram illustrating an example of a first pulse generator illustrated in FIG. 5 in accordance with aspects of the present invention.
Figure 7B:
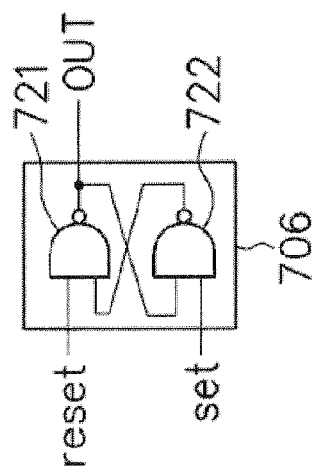
FIG. 7B is a diagram illustrating an example of a reset-set (RS) latch circuit illustrated in FIG. 7A in accordance with aspects of the present invention.
Figure 8:
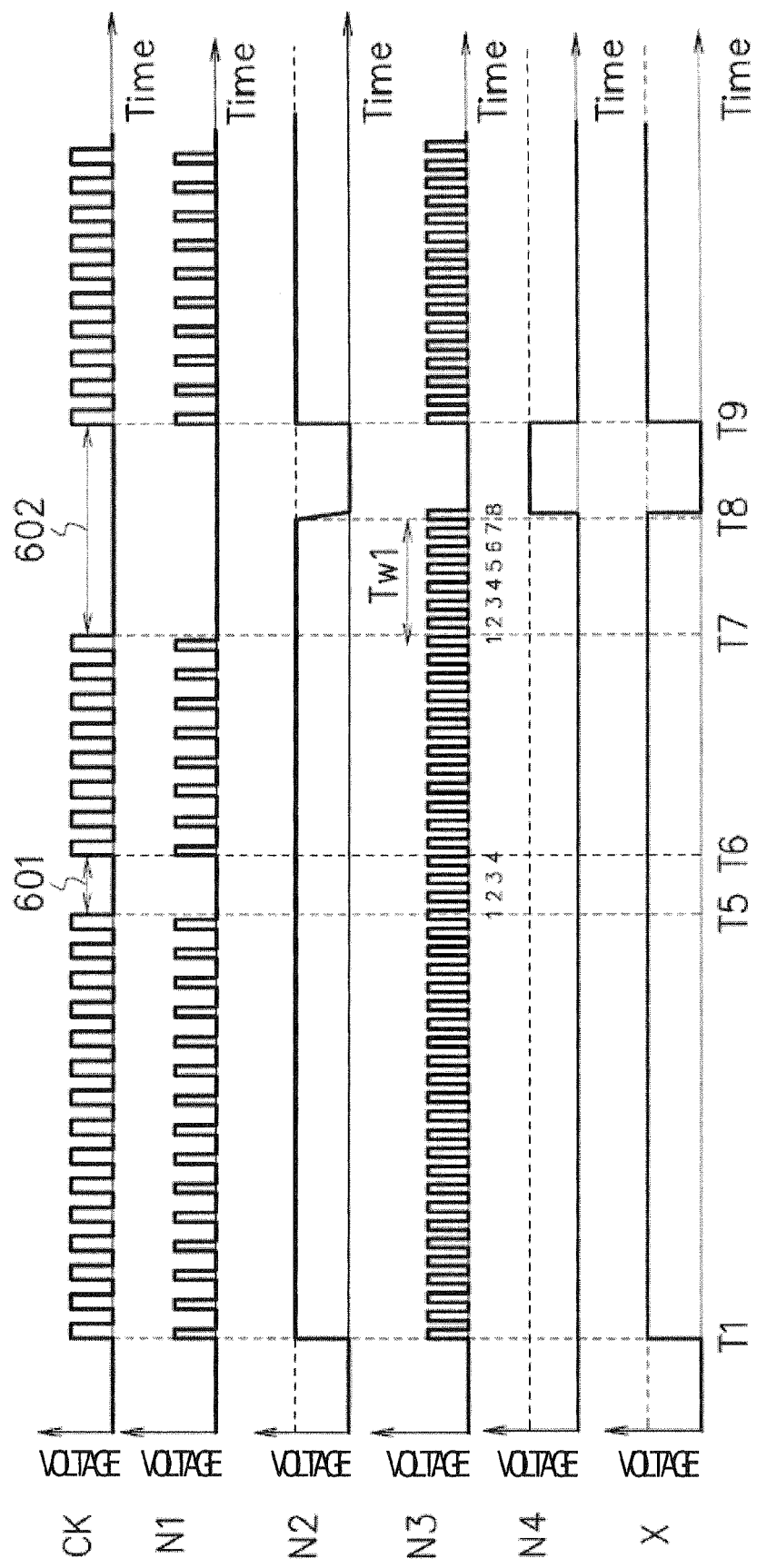
FIG. 8 is a timing chart illustrating an example of the operation of the first pulse generator illustrated in FIG. 7A in accordance with aspects of the present invention.

FIG. 7A is a diagram illustrating an example of the configuration of the first pulse generator 507 illustrated in FIG. 5. FIG. 7B is a diagram illustrating an example of the configuration of an RS latch circuit 706 illustrated in FIG. 7A. FIG. 8 is a timing chart illustrating an example of the operation of the first pulse generator 307 illustrated in FIG. 7A. The first pulse generator 307 includes an edge detector 701, an inverter 704, an AND circuit 705, the RS latch circuit 706, a ring oscillator 707, a counter 711, and an RS latch circuit 712. The edge detector 701 includes an inverter 702 and an AND circuit 703. The ring oscillator 707 includes a NAND circuit 708 and inverters 709 and 710.

As illustrated in FIG. 7B, the RS latch circuit 706 includes NAND circuits 721 and 722. An output signal becomes a low level when a reset signal reset becomes a high level and a set signal set becomes a low level. The output signal becomes a high level when the reset signal reset becomes a low level and the set signal set becomes a high level. The RS latch circuit 712 has substantially the same configuration as that of the RS latch circuit 706. The counter 711 it set to, for example, an 8-bit counter in accordance with the pulse width Tw1. An 8-bit count period corresponds to the pulse width Tw1.

In an initial state, 0 is set to the counter 711. It is assumed that a pulse repeating period of the input clock signal CK is sufficiently short, and an output signal N4 of the counter 711 at a subsequent stage is not changed by a pulse of an output signal N3 of the ring oscillator 707. At time T1, the edge of the input clock signal CK is detected, and a pulse is generated in a signal N1. Accordingly, the 8-bit counter 711 is reset to 0, the signal N4 becomes a low level, and an output signal N2 of the RS latch circuit 706 and an output signal X of the RS latch circuit 712 become a high level. Thereafter, because pulses are interruptedly generated in the signal N1 until time T5, the 8-bit counter 711 is reset to 0, the signal N4 becomes a low level, and the output signal N2 of the RS latch circuit 706 and the output signal X of the RS latch circuit 712 maintain a high level. The counter 711 is not reset when the input clock signal CK is stopped at time T5, and the counter 711 counts up. If the output remains unchanged in a period up to time T6, the counter 711 is reset at substantially the same time as a pulse is input to the input signal CK at time T6. Thus, the signal N4 remains unchanged. Similarly at time T7, the input clock signal CK is stopped, and the counter 711 counts up again. This time, it is assumed that the output signal N4 of the counter 711 becomes a high level at time T8. Accordingly, the RS latch circuit 712 is reset, and the signal X returns to a low level. At substantially the same time, the output signal N2 of the RS latch circuit 706 becomes a low level, and the ring oscillator 707 stops. At time T9, the state becomes substantially the same as that at time T1. Accordingly, the function of the first pulse generator 307 may be realized. The pulse width Tw1 may be controlled by changing the number of counts by changing the output of the counter 711.

The second pulse generator 308 illustrated in FIG. 5 has substantially the same configuration as that of the first pulse generator 307 illustrated in FIG. 7A. The second pulse generator 308 outputs a pulse Y at a high level from when the pulse output by the first pulse generator 307 becomes a high level to when a period of the pulse width Tw2 elapses based on a counter. The third pulse generator 503 illustrated in FIG. 5 has substantially the same configuration as that of the first pulse generator illustrated in FIG. 7A. The third pulse generator 503 outputs a pulse E at a high level from when the reset signal RS of the first semiconductor circuit 306 changes to when the period of the pulse width Tw2 elapses based on a counter.

Third Exemplary Implementation

Figure 9:
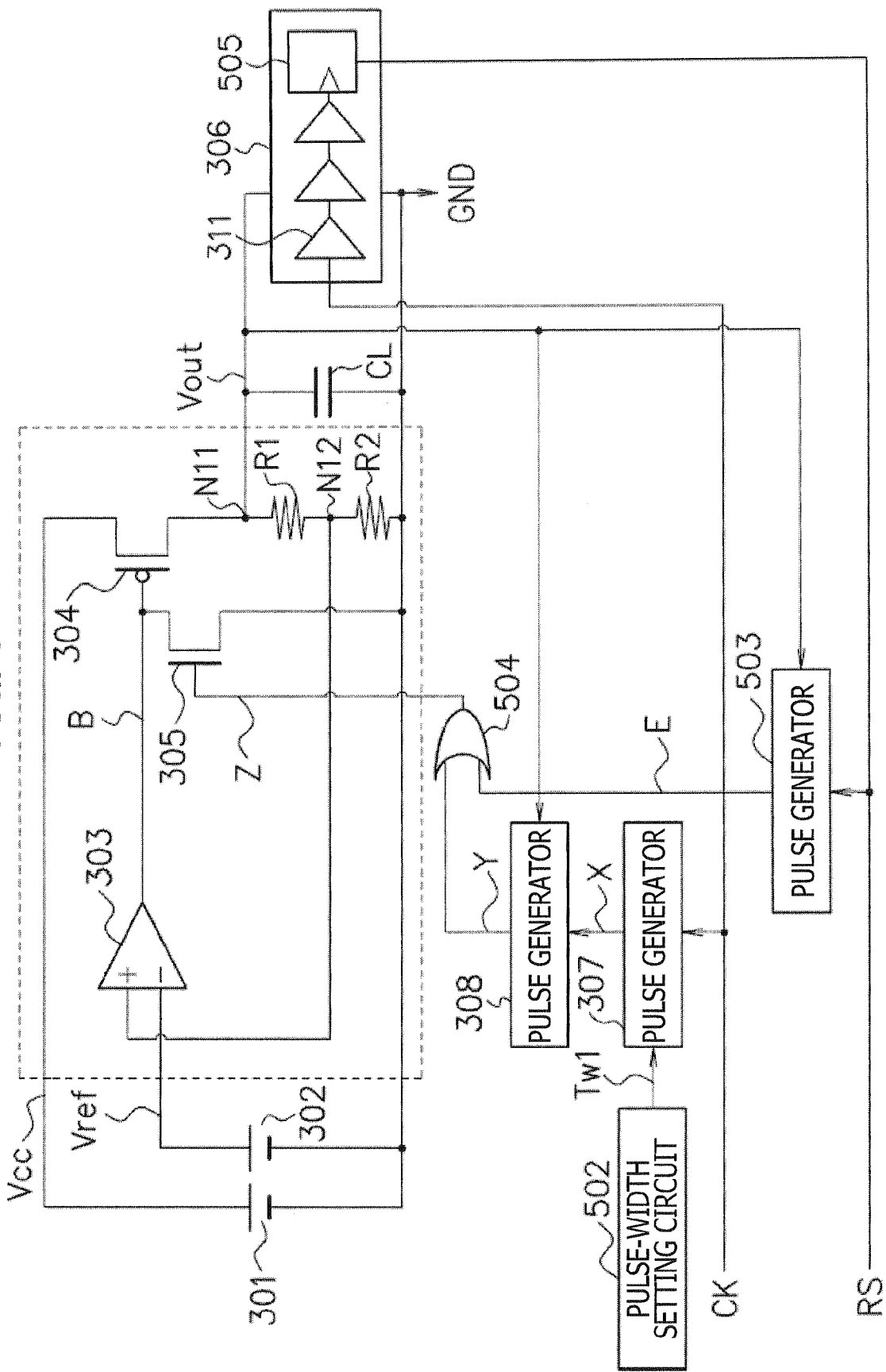
FIG. 9 is a diagram illustrating an example of a voltage regulator circuit according to a third exemplary implementation in accordance with aspects of the present invention.
Figure 10:
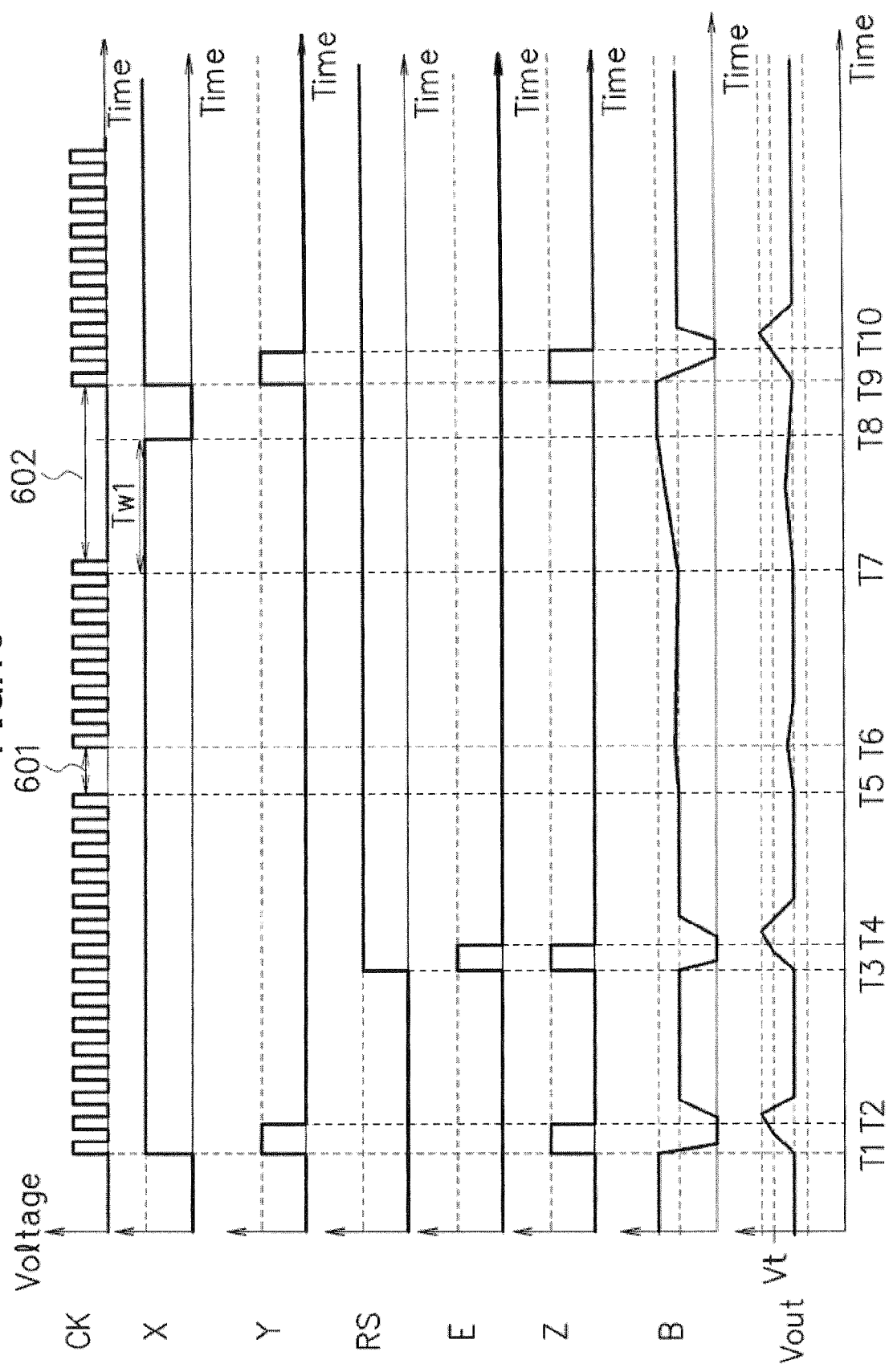
FIG. 10 is a timing chart illustrating an example of the operation of the voltage regulator circuit illustrated in FIG. 9 in accordance with aspects of the present invention.

FIG. 9 is a diagram illustrating an example of the configuration of a voltage regulator circuit according to a third exemplary implementation in accordance with aspects of the present invention. FIG. 10 is a timing chart illustrating an example of the operation of the voltage regulator circuit illustrated in FIG. 9. The third exemplary implementation (FIG. 9) is different from the second exemplary implementation (FIG. 5) in the point that the second pulse generator 308 and the third pulse generator 503 set pulse widths in accordance with the output voltage Vout. Hereinafter, the points that the third exemplary implementation is different from the second exemplary implementation will be described. The second pulse generator 308 and the third pulse generator 503 receive the output voltage Vout instead of the pulse width Tw2 from the pulse-width setting circuit 501. The second pulse generator 308 changes its output pulse Y to a low level when the output voltage Vout becomes higher than a first voltage Vt. Similarly, the third pulse generator 503 changes its output pulse E to a low level when the output voltage Vout becomes higher than the first voltage Vt. That is, the second pulse generator 308 outputs the pulse Y at a high level from when the pulse X output by the first pulse generator 307 becomes a high level to when the drain voltage Vout of the first FET 304 exceeds the first voltage Vt. Similarly, the third pulse generator 503 outputs the pulse E at a high level from when the reset signal RS of the first semiconductor circuit 306 changes to when the drain voltage Vout of the first FET 304 exceeds the first voltage Vt. Accordingly, in the third exemplary implementation, the time in which the output voltage Vout waits for the power supply potential Vcc becomes shorter, compared with the second exemplary implementation, and the power consumption may be reduced.

Figure 11:
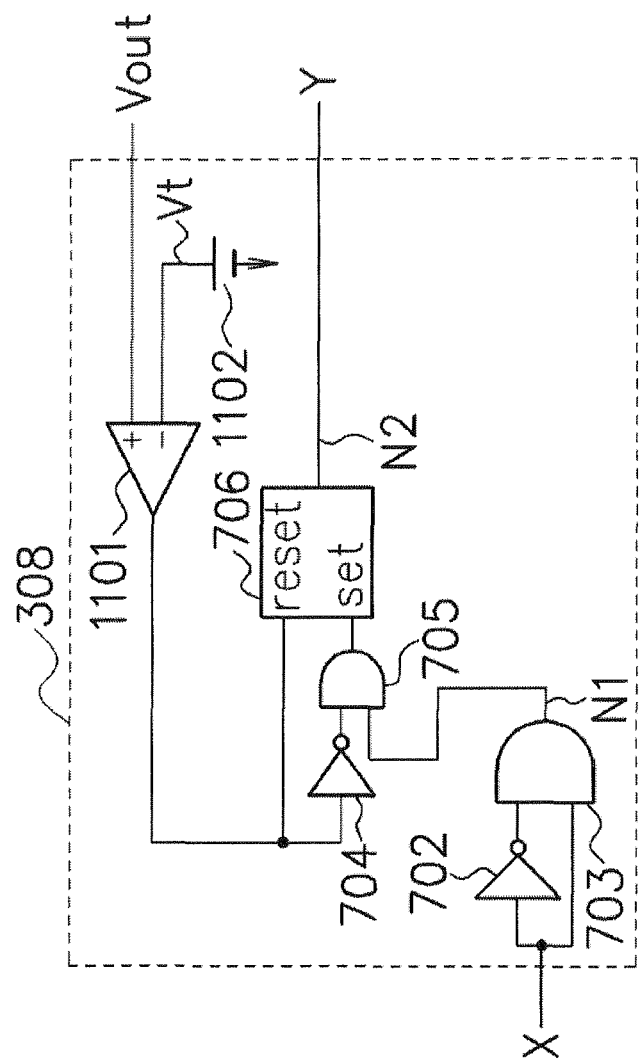
FIG. 11 is a diagram illustrating an example of a second pulse generator illustrated in FIG. 9 in accordance with aspects of the present invention.

FIG. 11 is a diagram illustrating an example of the configuration of the second pulse generator 308 illustrated in FIG. 9. Since the third pulse generator 503 has substantially the same configuration as that of the second pulse generator 308, the configuration of the second pulse generator 308 will be described by way of example. The second pulse generator 308 includes the inverter 702, the AND circuit 703, the inverter 704, the AND circuit 705, the RS latch circuit 706, a comparator 1101, and a DC power source 1102. The DC power source 1102 supplies the first voltage Vt. The pulse X is input to the inverter 702 and the AND circuit 703. The pulse Y is output from the RS latch circuit 706. The comparator 1101 outputs a high level when the output voltage Vout is higher than the first voltage Vt, and outputs a low level when the output voltage Vout is less than or equal to the first voltage Vt. The RS latch circuit 706 is reset and outputs the pulse Y at a low level when the comparator 1101 outputs a high level.

Fourth Exemplary Implementation

Figure 12:
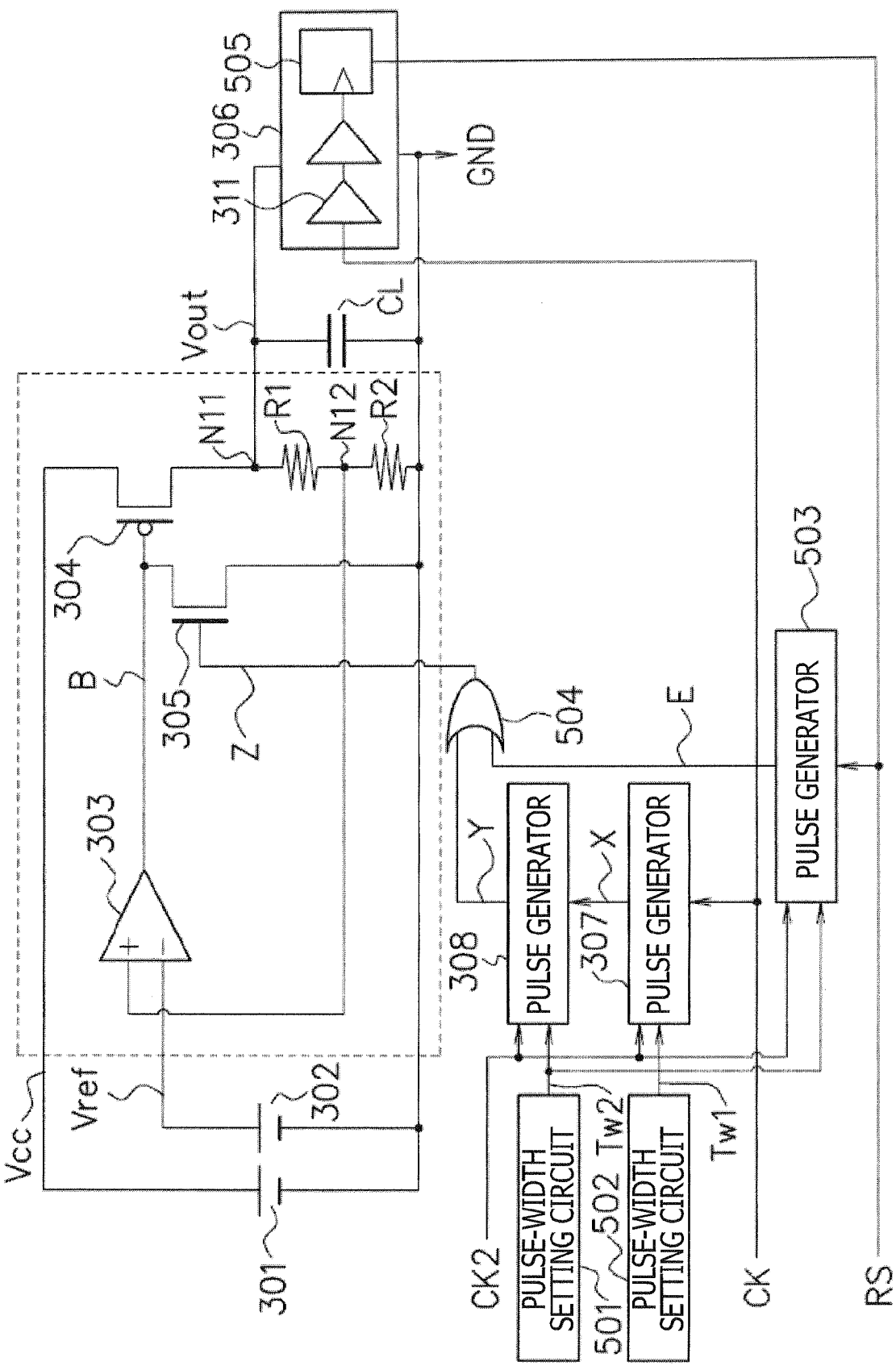
FIG. 12 is a diagram illustrating an example of a voltage regulator circuit according to a fourth exemplary implementation in accordance with aspects of the present invention.
Figure 13:
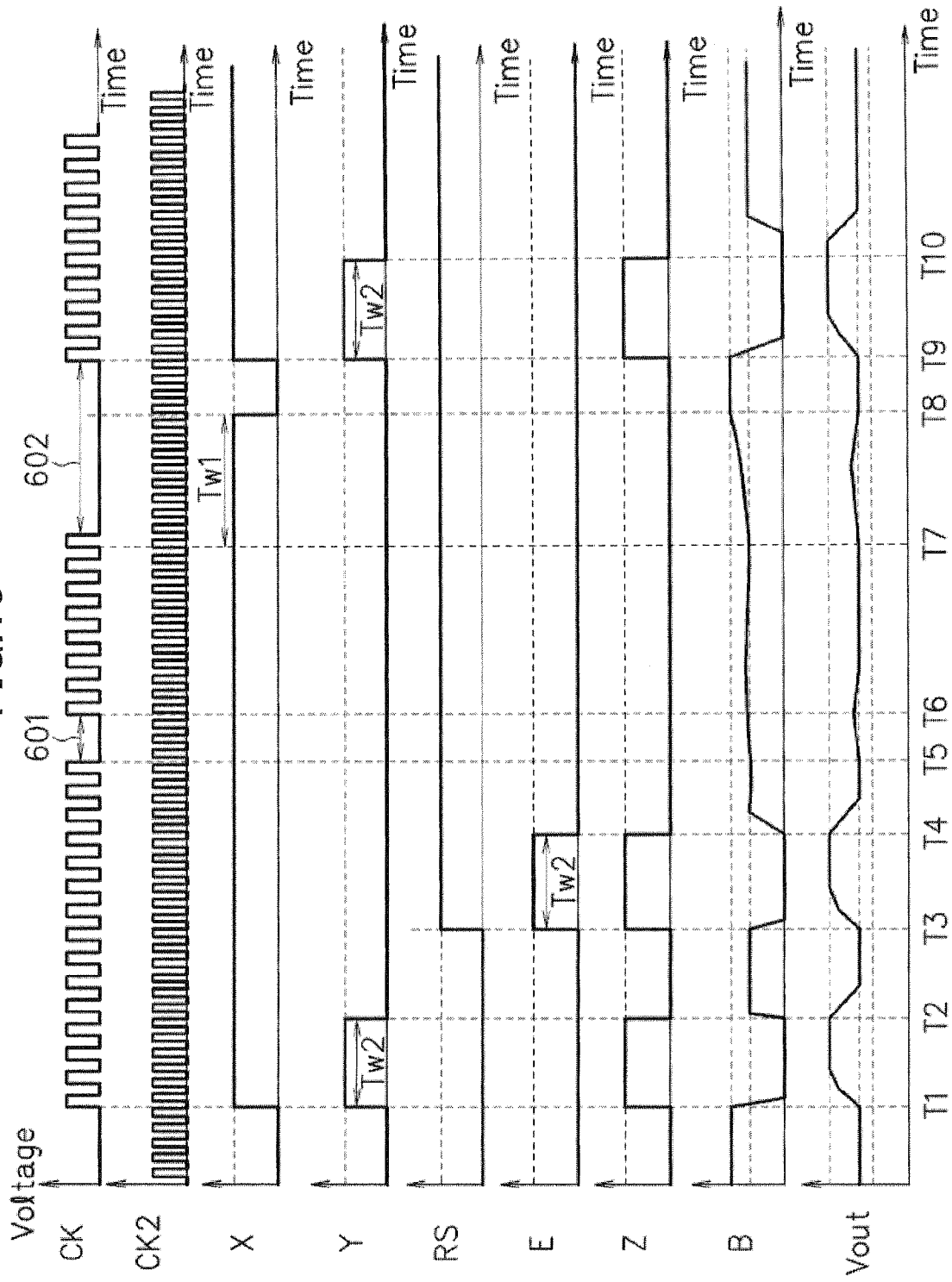
FIG. 13 is a timing chart illustrating an example of the operation of the voltage regulator circuit illustrated in FIG. 12 in accordance with aspects of the present invention.

FIG. 12 is a diagram illustrating an example of the configuration of a voltage regulator circuit according to a fourth exemplary implementation in accordance with aspects of the present invention. FIG. 12 is a timing chart illustrating an example of the operation of the voltage regulator circuit illustrated in FIG. 12. The fourth exemplary implementation (FIG. 12) is different from the second exemplary implementation (FIG. 5) in the point that a clock signal CK2 is input to the first pulse generator 307, the second pulse generator 308, and the third pulse generator 503. Hereinafter, the points that the fourth exemplary implementation is different from the second exemplary implementation will be described. FIG. 13 is the same as FIG. 6 except that the clock signal CK2 is added.

Figure 14:
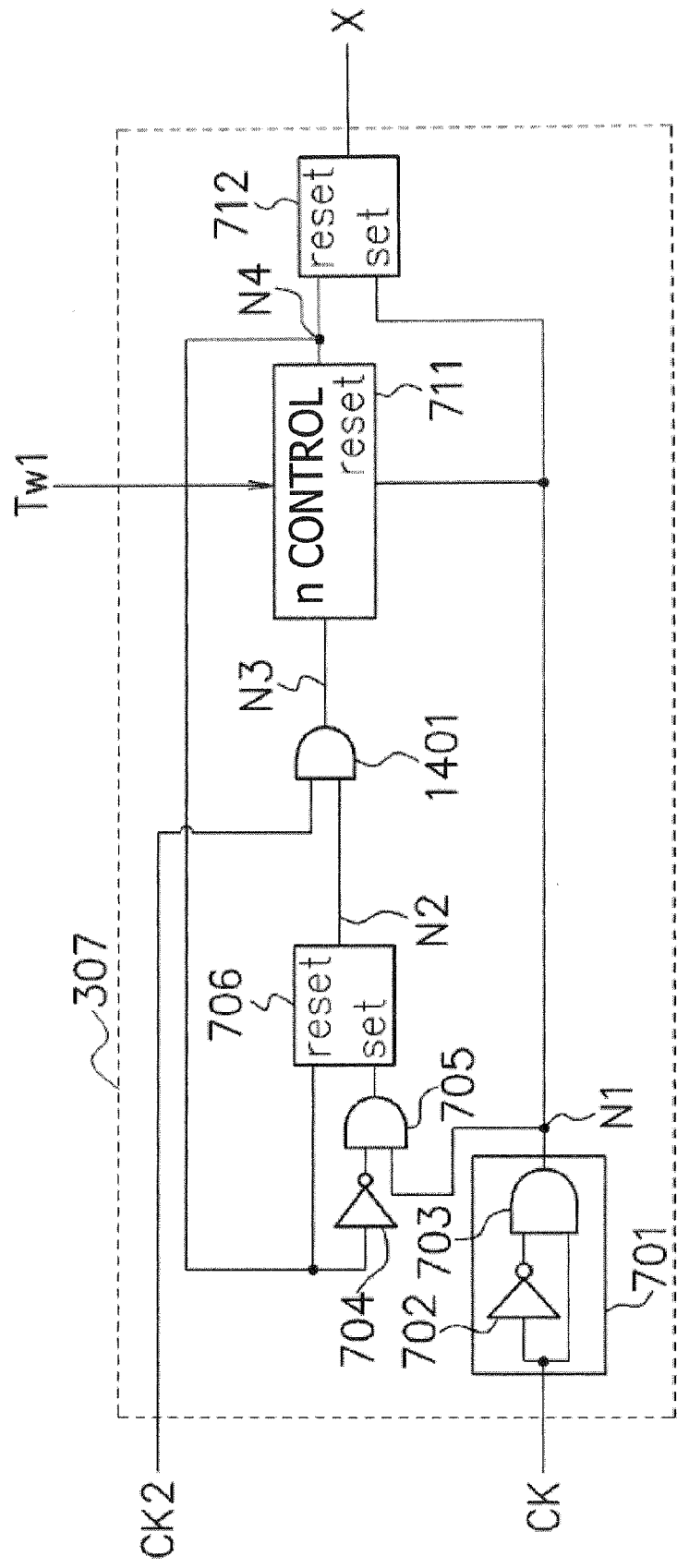
FIG. 14 is a diagram illustrating an example of a first pulse generator illustrated in FIG. 12 in accordance with aspects of the present invention.

FIG. 14 is a diagram illustrating an example of the configuration of the first pulse generator 307 illustrated in FIG. 12. The first pulse generator 307 illustrated in FIG. 14 is obtained by providing an AND circuit 1401, instead of the ring oscillator 707, in the first pulse generator 307 illustrated in FIG. 7A. Hereinafter, the points that the first pulse generator 307 illustrated in FIG. 14 is different from the first pulse generator 307 illustrated in FIG. 7A will be described. The AND circuit 1401 outputs an AND signal N3 of the output signal N2 of the RS latch circuit 706 and the clock signal CK2 to the counter 711. The clock signal CK2 is input as it is to the counter 711 or is fixed to a high level and input to the counter 711, in accordance with the output signal N2 of the RS latch circuit 706. Therefore, the operation in the fourth exemplary implementation is the same as that in FIG. 8 when the frequency of the ring oscillator 707 illustrated in FIG. 7A is substantially the same as the frequency of the clock signal CK2 illustrated in FIG. 14. Accordingly, in the fourth exemplary implementation, the pulse X at a high level may be output for a certain time in response to the rising edge of the input clock CK, which serves as a trigger. Since the clock signal CK2, which is more stable than the oscillation frequency of the ring oscillator 707, may be used in the fourth exemplary implementation, in the fourth exemplary implementation, a circuit that is more independent of the manufacturing variations may be realized, compared with the second exemplary implementation. Therefore, in the fourth exemplary implementation, the time in which the second FET 305 is turned ON may be minimized, and the power consumption may be reduced.

Fifth Exemplary Implementation

Figure 15:
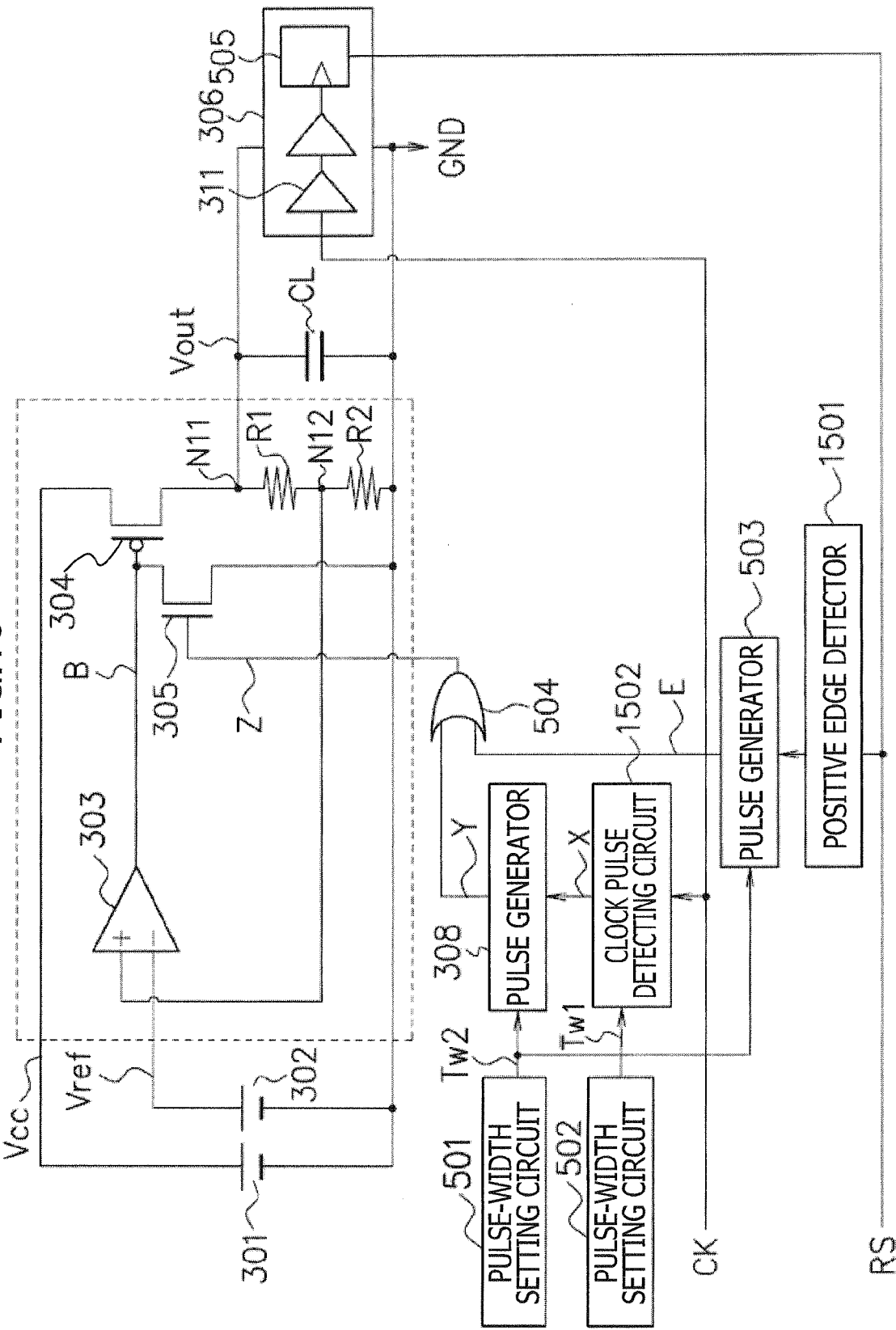
FIG. 15 is a diagram illustrating an example of a voltage regulator circuit according to a fifth exemplary implementation in accordance with aspects of the present invention.
Figure 16:
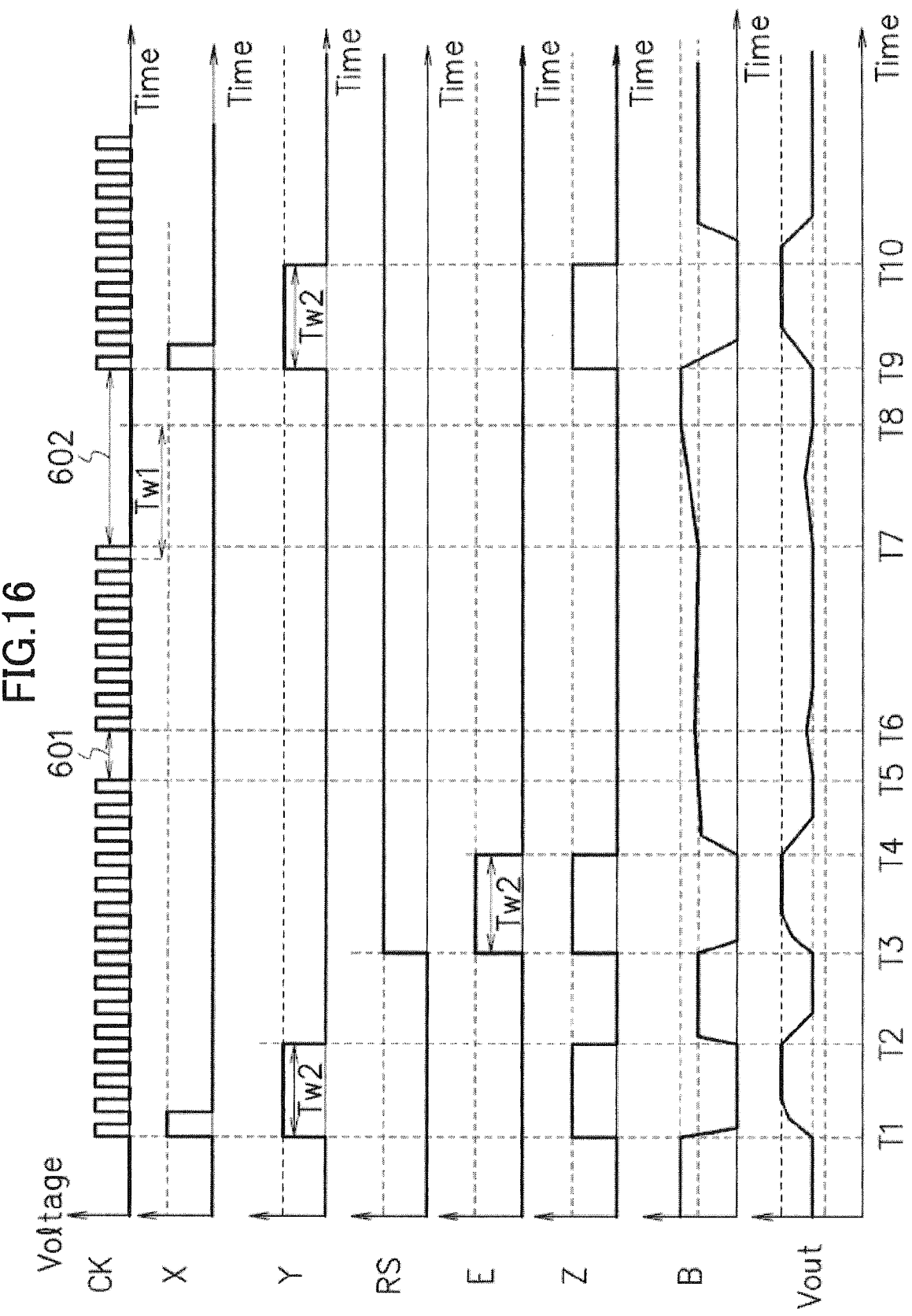
FIG. 16 is a timing chart illustrating an example of the operation of the voltage regulator circuit illustrated in FIG. 15 in accordance with aspects of the present invention.

FIG. 15 is a diagram illustrating an example of a voltage regulator circuit according to a fifth exemplary implementation in accordance with aspects of the present invention. FIG. 16 is a timing chart illustrating an example of the operation of the voltage regulator circuit illustrated in FIG. 15. This exemplary implementation (FIG. 15) is different from the second exemplary implementation (FIG. 5) in the point that, instead of the first pulse generator 307, a clock pulse detecting circuit (first pulse generator) 1502 is provided, and a positive edge detector 1501 is added. FIG. 16 is the same as FIG. 6 except for the waveform of the pulse X. Hereinafter, the points that the fifth exemplary implementation is different from the second exemplary implementation will be described.

The clock pulse detecting circuit 1502 receives the pulse width Tw1 output from the pulse-width setting circuit 502. The clock pulse detecting circuit 1502 outputs the pulse X at a high level for a certain time to the pulse generator 308 when the clock pulse detecting circuit 1502 detects a positive edge (rising edge) after the input signal (clock signal) CK of the first semiconductor circuit 306 maintains a low level for a period of the pulse width Tw1. That is, the clock pulse detecting circuit 1502 does not change its level for the period of the pulse width Tw1 (first period) where the input signal CK of the first semiconductor circuit 306 maintains a low level, and, thereafter, the clock pulse detecting circuit 1502 changes its output from a low level (second level) to a high level (first level) when the clock pulse detecting circuit 1502 detects the positive edge of the input signal CK of the first semiconductor circuit 306. The operation of the second pulse generator 308 is the same as that in the second exemplary implementation and will be described later with reference to FIGS. 19 and 20. The positive edge detector 1501 outputs a pulse at a high level for a certain time to the pulse generator 503 when the positive edge detector 1501 detects the positive edge of the reset signal RS of the first semiconductor circuit 306. The operation of the pulse generator 503 is the same as that in the second exemplary implementation and will be described later with reference to FIGS. 19 and 20.

Figure 23:
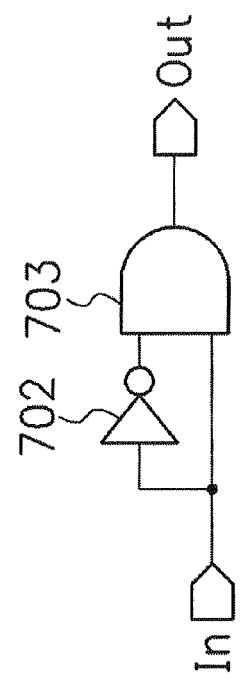
FIG. 23 is a diagram illustrating an example of a positive edge detector illustrated in FIG. 15 in accordance with aspects of the present invention.

FIG. 23 is a diagram illustrating an example of the configuration of the positive edge detector 1501 illustrated in FIG. 15. The positive edge detector 1501 includes, as in FIG. 7A, the inverter 702 and the AND circuit 703. The positive edge detector 1501 receives the reset signal RS at an input terminal, and outputs a pulse similar to the signal N1 illustrated in FIG. 8 from an output terminal Out.

Figure 17:
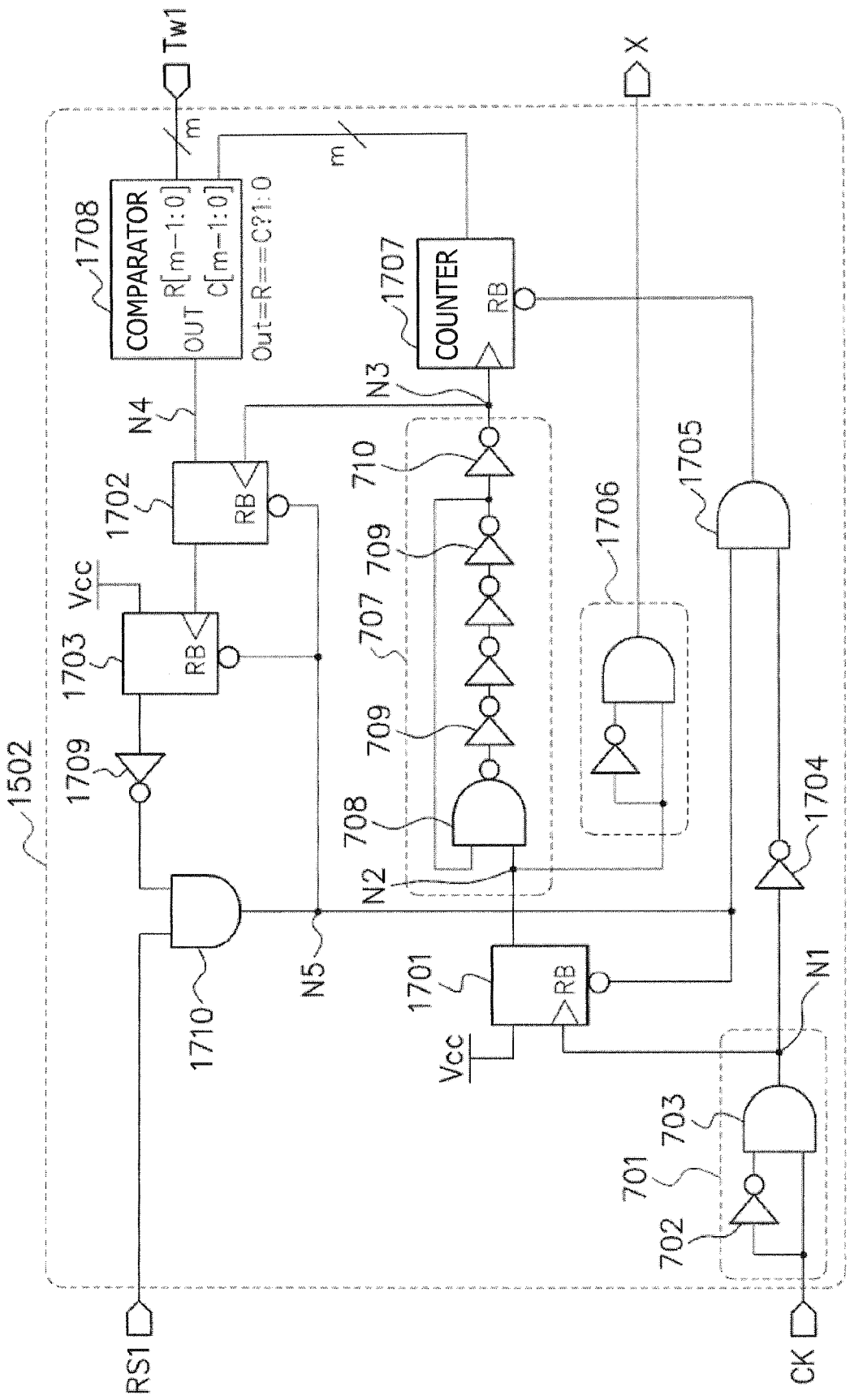
FIG. 17 is a diagram illustrating an example of a clock pulse detecting circuit illustrated in FIG. 15 in accordance with aspects of the present invention.
Figure 18:
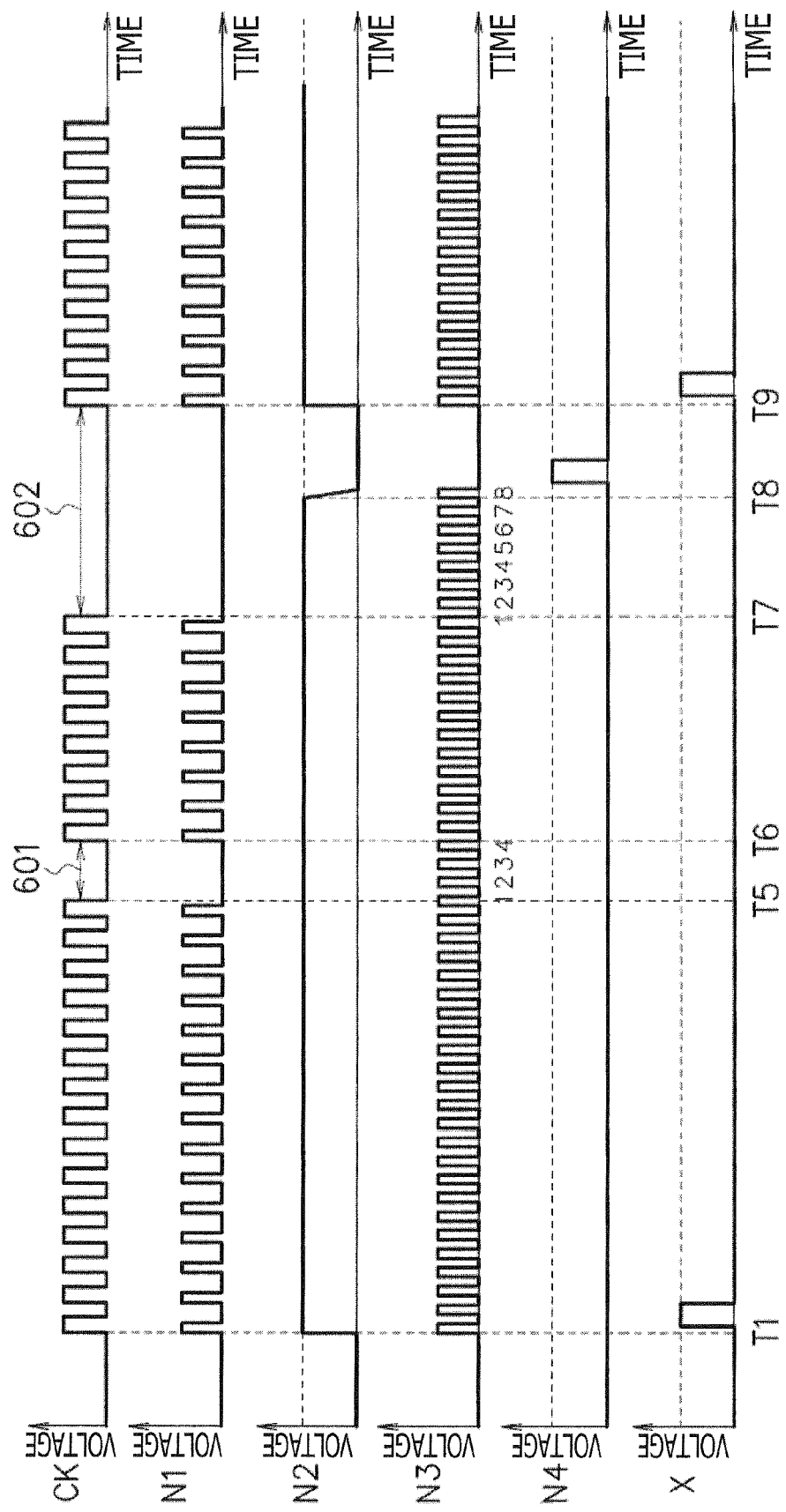
FIG. 18 is a timing chart illustrating an example of the operation of the clock pulse detecting circuit illustrated in FIG. 17 in accordance with aspects of the present invention.

FIG. 17 is a diagram illustrating an example of the configuration of the clock pulse detecting circuit 1502 illustrated in FIG. 15. FIG. 18 is a timing chart illustrating an example of the operation of the clock pulse detecting circuit 1502 illustrated in FIG. 17. The positive edge detector 701 includes, as in FIG. 7A, the inverter 702 and the AND circuit 703. The positive edge detector 701 detects the positive edge of the input signal (clock signal) CK and outputs the signal N1. An inverter 1704 outputs a logic-inverted signal of the signal N1. An AND circuit 1705 outputs an AND signal of the output signal of the inverter 1704 and the signal N5. A D-type flip-flop 1701 receives the power supply potential Vcc at an input terminal, receives the signal N1 at a clock terminal, receives the signal N5 at a reset bar terminal RB, and outputs the signal N2 from an output terminal. A positive edge detector 1706 includes an inverter and an AND circuit. The positive edge detector 1706 detects the positive edge of the signal N2, and outputs the pulse X. The ring oscillator 707 includes, as in FIG. 7A, the NAND circuit 708 and the inverters 709 and 710. The ring oscillator 707 outputs an oscillation signal N3 for a period where the signal N2 is at a high level. A counter 1707 has a reset bar terminal RB connected to an output terminal of the AND circuit 1705, counts pulses of the signal N3, and outputs an m-bit count value. A comparator 1708 receives, at an input terminal C, the m-bit count value of the counter 1707, receives, at an input terminal R, the m-bit pulse width Tw1 (e.g., 8), and outputs the signal N4 indicating the comparison result from an output terminal OUT. Specifically, the comparator 1708 outputs the signal N4 at a high level when the count value and the pulse width Tw1 are substantially the same, and outputs the signal N4 at a low level when the count value and the pulse width Tw1 are different. A D-type flip-flop 1702 receives the signal N4 at an input terminal, receives the signal N3 at a clock terminal, and receives the signal N5 at a reset bar terminal RB. A D-type flip-flop 1703 receives the power supply potential Vcc at an input terminal, an output signal of the D-type flip-flop 1702 at a clock terminal, and receives the signal N5 at a reset bar terminal RB. An inverter 1709 outputs a logic-inverted signal of an output signal of the D-type flip-flop 1703. An AND circuit 1710 outputs the AND signal N5 of the output signal of the inverter 1709 and a reset signal RS1.

The positive edge detector 701 generates a one-shot pulse signal N1 when a clock signal is input as the input signal CK to the positive edge detector 701 at time T1. The one-shot pulse signal N1 is input to the clock terminal of the D-type flip-flop 1701. Then, the D-type flip-flop 1701 outputs the signal N2 at a high level. The positive edge detector 1706 generates and outputs a one-shot pulse X when the signal N2 changes from a low level to a high level. The ring oscillator 707 oscillates and outputs the clock-pulse signal N3 when the signal N2 becomes a high level. A one-shot pulse is continuously generated as the signal N1 when a state where the clock signal is continuously input as the input signal CK continues, and a high level and a low level are alternately input to the reset bar terminal RB of the counter 1707. Thus, the counter 1707 is constantly in a reset state. The counter 1707 is reset when a low level is input to the reset bar terminal RB. That is, the output value of the counter 1707 is 0 as long as the clock signal is input as the input signal CK. However, when the inputting of the clock signal as the input signal CK stops, the reset bar terminal RB of the counter 1707 enters a reset-cancelled state. Accordingly, the output value of the counter 1707 is incremented by the oscillation clock signal N3 of the ring oscillator 707. The comparator 1708 outputs the signal N4 at a high level when the output value of the counter 1707 becomes substantially the same value as the pulse width Tw1. The D-type flip-flop 1702, which receives the signal N4, outputs a high level to the clock terminal of the D-type flip-flop 1703 when the signal N4 becomes a high level. Accordingly, the D-type flip-flop 1703 outputs a high level, and the signal N5 becomes a low level. The D-type flip-flops 1701 to 1703 and the counter 1707 receive a low level at their reset bar terminals RBs and are reset when the signal N5 becomes a low level. The ring oscillator 707 stops oscillating when the D-type flip-flop 1701 is reset and outputs the signal N2 at a low level. The D-type flip-flop 1703 is reset and outputs a low level. Then, the signal N5 becomes a high level, and the resetting of the D-type flip-flops 1701 to 1703 and the counter 1707 is cancelled. Thereafter, the operation subsequent to time T9 is substantially the same as that subsequent to T1. The clock stopped period 601 corresponds to a period from time T5 to time 16 and is shorter than the period of the pulse width Tw1. Thus, the pulse X maintains a low level. In contrast, the clock stopped period 602 corresponds to a period from time T7 to time T9 and is longer than the period of the pulse width Tw1. Thus, the pulse X becomes a high level at time T9 at which the inputting of the clock signal is resumed.

Figure 19:
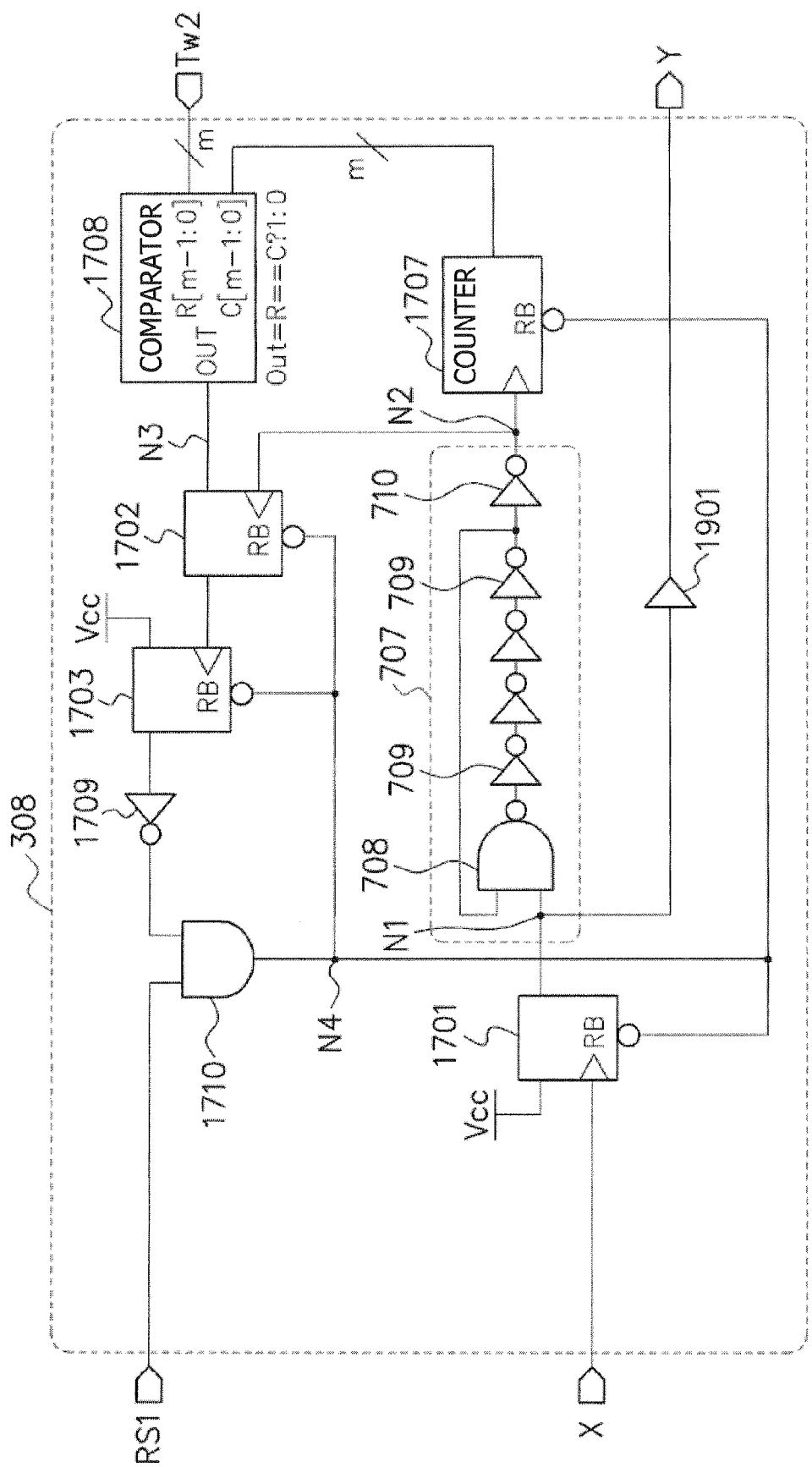
FIG. 19 is a diagram illustrating an example of a pulse generator illustrated in FIG. 15 in accordance with aspects of the present invention.
Figure 20:
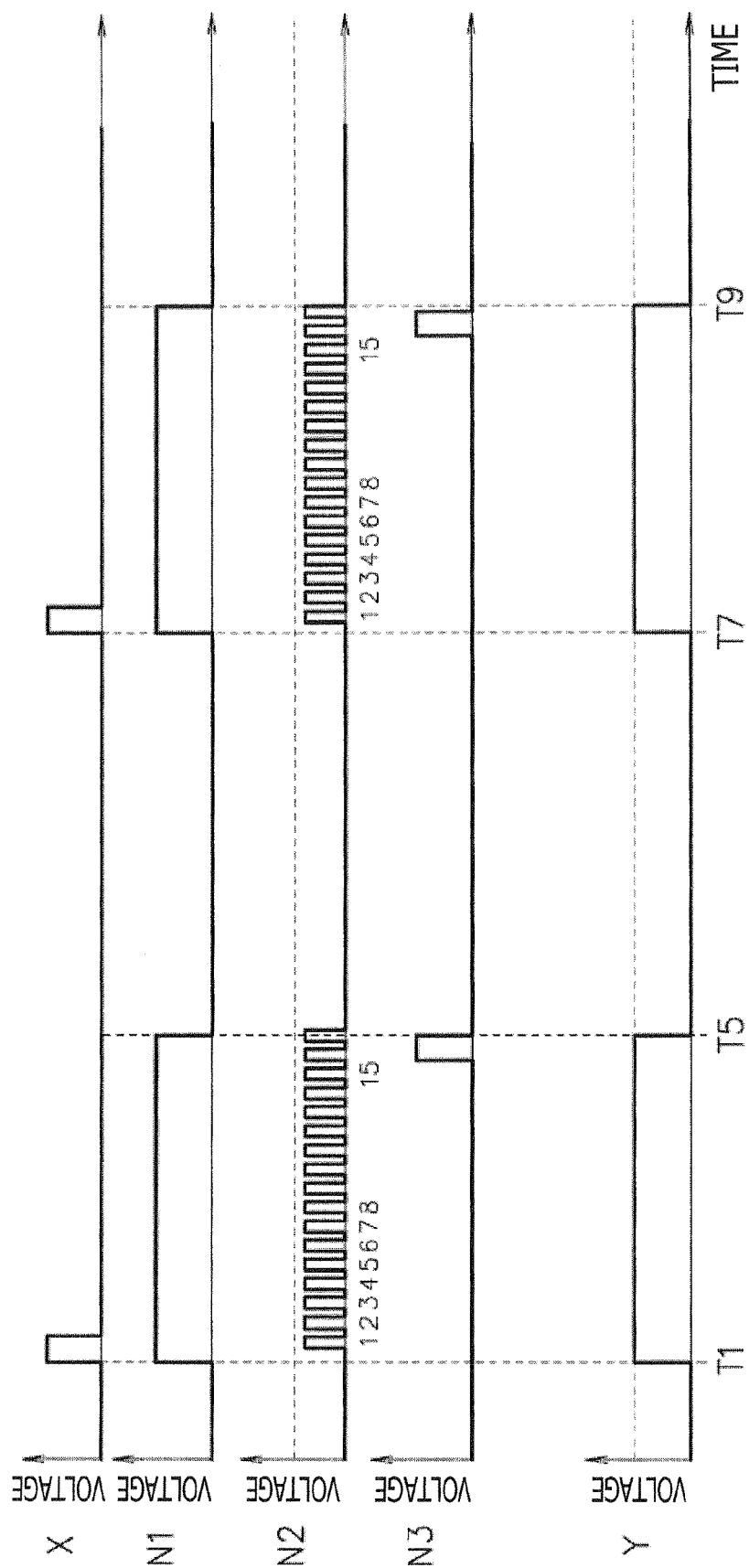
FIG. 20 is a timing chart illustrating an example of the operation of the pulse generator illustrated in FIG. 19 in accordance with aspects of the present invention.

FIG. 19 is a diagram illustrating an example of the configuration of the pulse generator 308 illustrated in FIG. 15. FIG. 20 is a timing chart illustrating an example of the operation of the pulse generator 308 illustrated in FIG. 19. The pulse generator 503 illustrated in FIG. 15 has substantially the same configuration as that of the pulse generator 308.

The D-type flip-flop 1701 receives the power supply potential Vcc at the input terminal, receives the pulse X at the clock terminal, receives the signal N4 at the reset bar terminal RB, and outputs the signal N1 from the output terminal. A buffer 1901 buffers the signal N1 and outputs the pulse Y. The ring oscillator 707 includes, as in FIG. 7A, the NAND circuit 708 and the inverters 709 and 710. The ring oscillator 707 outputs the oscillation signal N2 for a period where the signal N1 is at a high level. The counter 1707 receives the signal N4 at the reset bar terminal RB, counts pulses of the signal N2, and outputs an m-bit count value. The comparator 1708 receives, at the input terminal C, the m-bit count value of the counter 1707, receives, at the input terminal R, the m-bit pulse width Tw2 (e.g., 15), and outputs the signal N3 indicating the comparison result from the output terminal OUT. Specifically, the comparator 1708 outputs the signal N3 at a high level when the count value and the pulse width Tw2 are substantially the same, and outputs the signal N3 at a low level when the count value and the pulse width Tw1 are different. The D-type flip-flop 1702 receives the signal N3 at the input terminal, receives the signal N2 at the clock terminal, and receives the signal N4 at the reset bar terminal RB. The D-type flip-flop 1703 receives the power supply potential Vcc at the input terminal, receives the output signal of the D-type flip-flop 1702 at the clock terminal, and receives the signal N4 at the reset bar terminal RB. The inverter 1709 outputs a logic-inverted signal of the output signal of the D-type flip-flop 1703. The AND circuit 1710 outputs the AND signal N4 of the output signal of the inverter 1709 and the reset signal RS1.

The pulse generator 308 illustrated in FIG. 19 is obtained by removing the two positive edge detectors 701 and 1706 from the clock pulse detecting circuit 1502 illustrated in FIG. 17. The D-type flip-flop 1701 outputs the signal N1 at a high level when a one-shot pulse is input as the pulse X at time T1. A signal of the pulse Y is substantially the same signal as the signal N1. The ring oscillator 707 outputs the oscillation clock signal N2 when the signal N1 becomes a high level. The counter 1707 increments the count value when the clock signal is output as the signal N2. The comparator 1708 outputs the signal N3 at a high level when the count value becomes substantially the same value as the pulse width Tw2, and the D-type flip-flop 1702 outputs a high level. Then, the clock terminal of the D-type flip-flop 1703 changes from a low level to a high level, and the D-type flip-flop 1703 outputs a high level from the output terminal. As a result, the signal N4 changes from a high level to a low level, and the D-type flip-flops 1701 to 1703 and the counter 1707 are reset. As a result of the resetting, the D-type flip-flop 1701 outputs the signal N1 at a low level at time T5. The D-type flip-flop 1703 outputs a low level as a result of being reset, and the signal N4 becomes a high level. Then, the resetting of the D-type flip-flops 1701 to 1703 and the counter 1707 is cancelled. Thereafter, the operation from time T7 to time T9 is substantially the same as that from time T1 to time T5.

The RS latch circuit 706 is used in the pulse generators illustrated in FIG. 7A, FIG. 11, and FIG. 14. In contrast, the D-type flip-flops 1701 to 1703 are used in the clock pulse detecting circuit 1502 illustrated in FIG. 17 and the pulse generators 308 and 503 illustrated in FIG. 19. The advantage of using the D-type flip-flops 1701 to 1703 is that a synchronous circuit design environment, which is the design flow of a standard semiconductor integrated circuit, may be used as it is. Since the RS latch circuit 706 operates in a manner similar to an asynchronous circuit, the pulse generators illustrated in FIG. 7A, FIG. 11, and FIG. 14 are fabricated as hardware macros and mounted on a semiconductor integrated circuit. In contrast, the clock pulse detecting circuit 1502 illustrated in FIG. 17 and the pulse generators 308 and 503 illustrated in FIG. 19 using the D-type flip-flops 1701 to 1703 are advantageous in that the clock pulse detecting circuit 1502 and the pulse generators 308 and 503 may be mounted in accordance with a standard design flow of a semiconductor integrated circuit when a net list and design constraints are made (i.e., when the clock pulse detecting circuit 1502 and the pulse generators 308 and 503 are fabricated as software macros).

Sixth Exemplary Implementation

Figure 21:
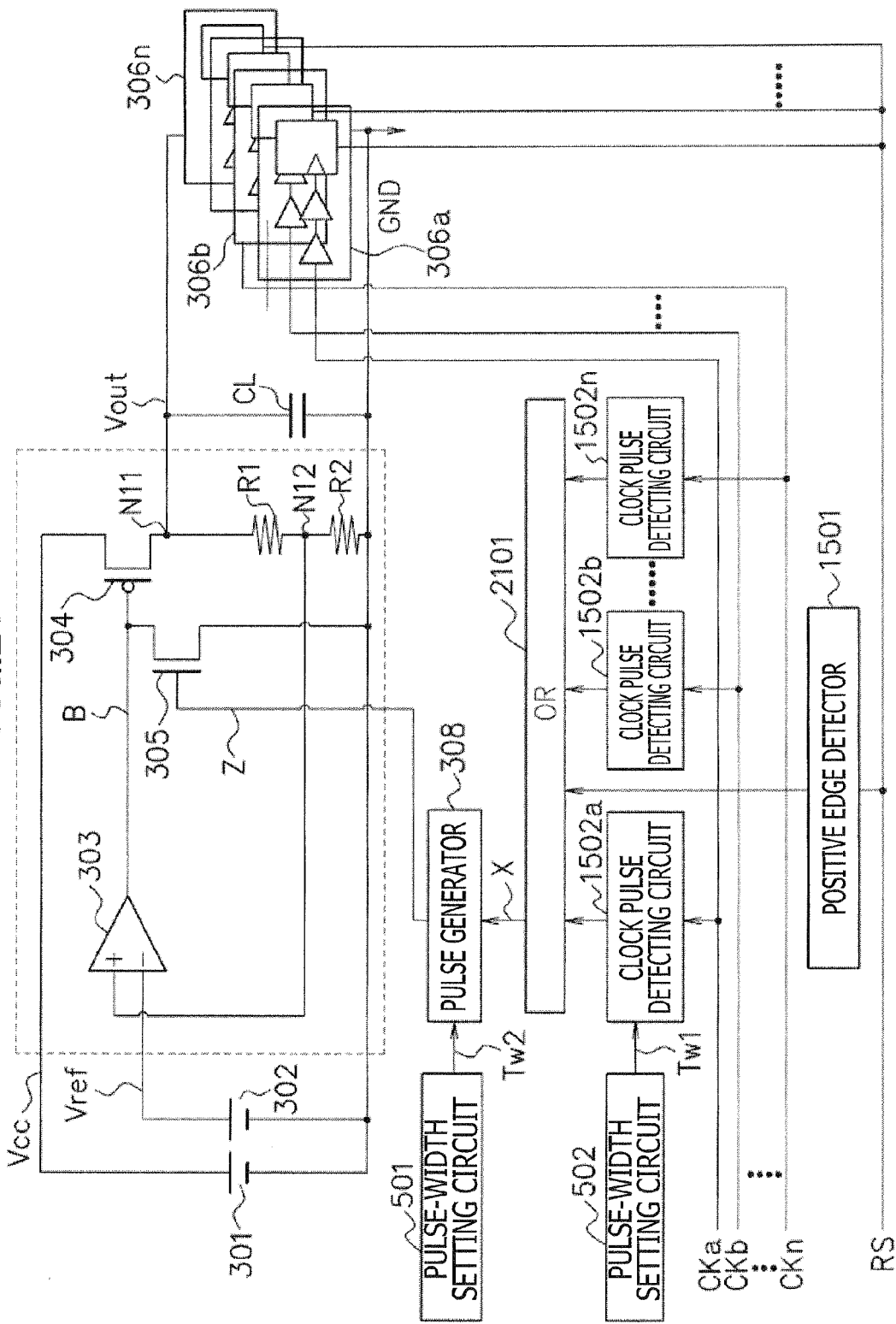
FIG. 21 is a diagram illustrating an example of a voltage regulator circuit according to a sixth exemplary implementation in accordance with aspects of the present invention.

FIG. 21 is a diagram illustrating an example of the configuration of a voltage regulator circuit according to a sixth exemplary implementation in accordance with aspects of the present invention. This exemplary implementation (FIG. 21) is obtained by providing a plurality of input signals CKa to CKn as the input signal CK, a plurality of clock pulse detecting circuits 1502a to 1502n as the clock pulse detecting circuit 1502, and a plurality of semiconductor circuits 306a to 306n as the semiconductor circuit 306, and by adding an OR circuit 2101 to the fifth exemplary implementation (FIG. 15). Hereinafter, the points that the sixth exemplary implementation is different from the fifth exemplary implementation will be described.

The semiconductor circuits 306a to 306n each include a buffer. The output voltage Vout is input to power supply potential terminals of the semiconductor circuits 306a to 306n, and the reference potential GND is input to reference potential terminals of the semiconductor circuits 306a to 306n. The semiconductor circuits 306a to 306n operate by receiving the input signals CKa to CKn, respectively. The clock pulse detecting circuits 1502a to 1502n receive the input signals CKa to CKn, respectively. The OR circuit 2101 outputs an OR signal of output signals of the clock pulse detecting circuits 1502a to 1502n and the positive edge detector 1501 as the pulse X. The pulse generator 308 receives the pulse X and the pulse width Tw2, and outputs the pulse Z to the gate of the n-channel FET 305.

A plurality of clock domains may exist in a semiconductor integrated circuit. This exemplary implementation may be applied to the semiconductor circuits 306a to 306n which use the plurality of clock signals CKa to CKn. A one-shot pulse is generated as the pulse X when any one of clock signals serving as the plurality of input signals CKa to CKn is activated. The operation when a one-shot pulse is generated is substantially the same as that in the fifth exemplary implementation. Similarly, aspects of the sixth exemplary implementation are applicable to the other exemplary implementations.

Seventh Exemplary Implementation

Figure 22:
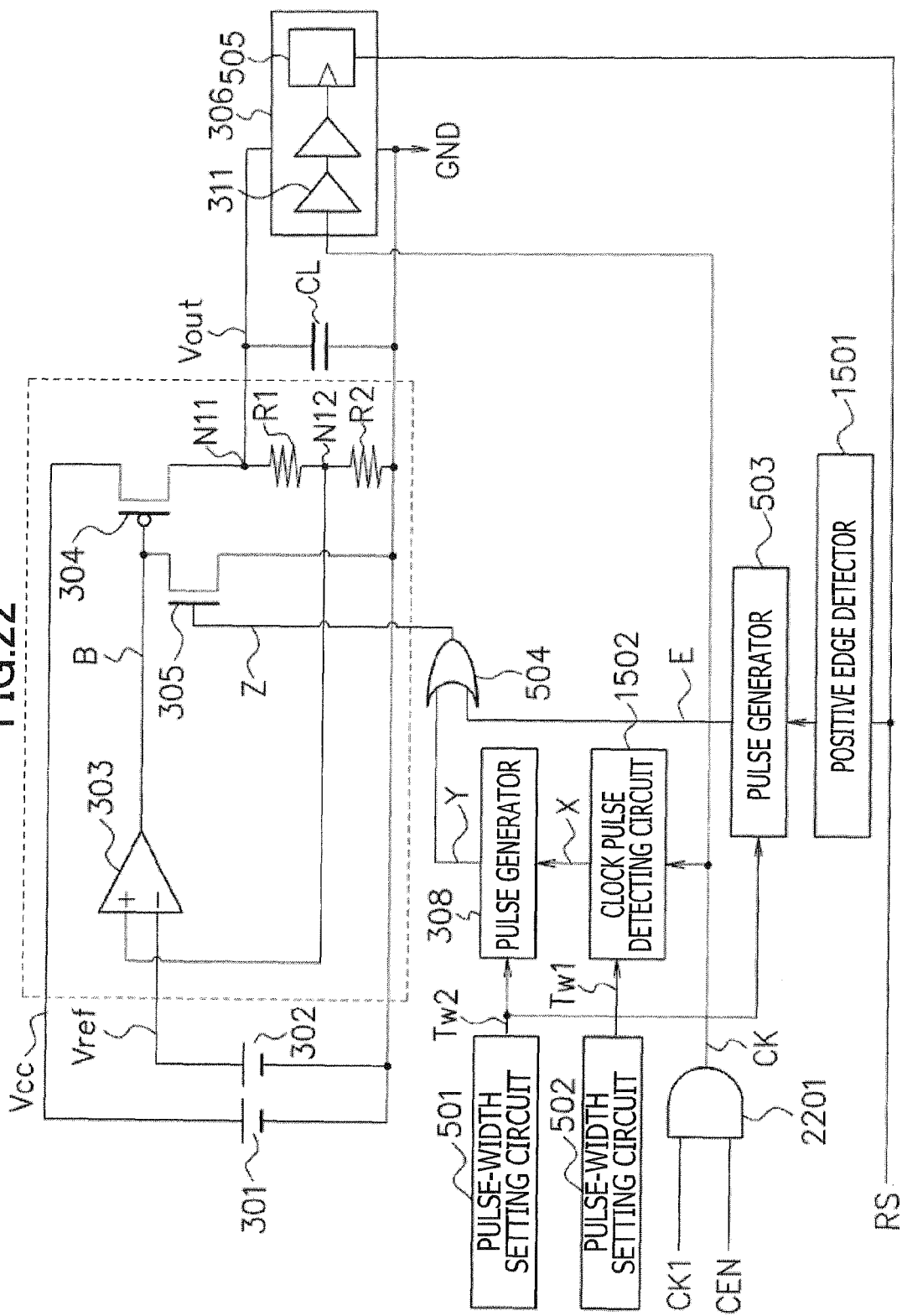
FIG. 22 is a diagram illustrating an example of a voltage regulator circuit according to a seventh exemplary implementation in accordance with aspects of the present invention.
Figure 25:
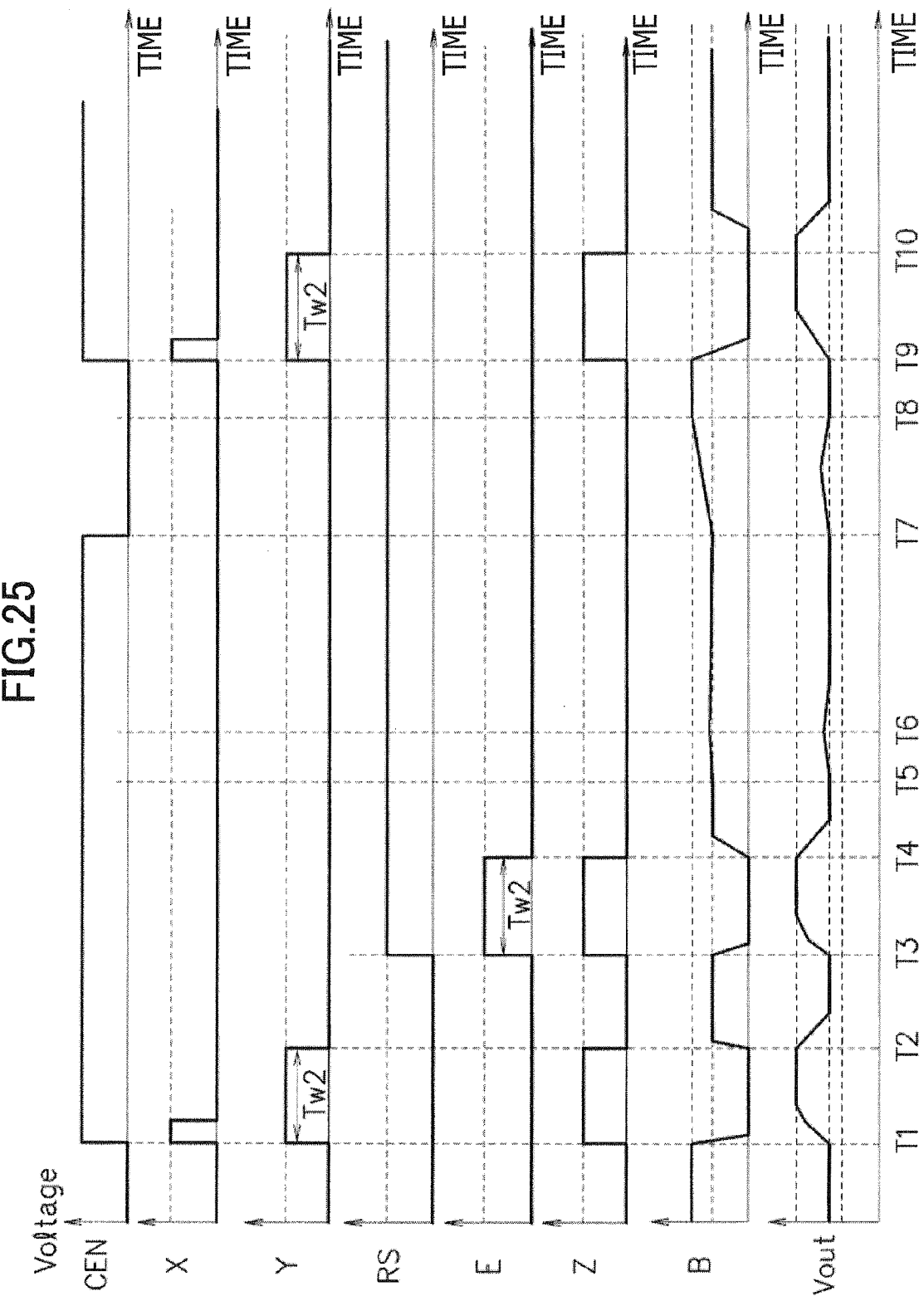
FIG. 25 is a timing chart illustrating an example of the operation of the voltage regulator circuit illustrated in FIG. 24 in accordance with aspects of the present invention.

FIG. 22 is a diagram illustrating an example of the configuration of a voltage regulator circuit according to a seventh exemplary implementation in accordance with aspects of the present invention. This exemplary implementation (FIG. 22) is obtained by adding an AND circuit 2201 to the fifth exemplary implementation (FIG. 15). Hereinafter, the points that the seventh exemplary implementation is different from the fifth exemplary implementation will be described. The AND circuit 2201 outputs an AND signal (input signal) CK of a clock signal CK1 and an enable signal CEN (FIG. 25). The clock signal CK1 is a continuous clock signal having substantially the same frequency as that of the input signal CK illustrated in FIG. 16. The input signal CK is substantially the same signal as the input signal CK illustrated in FIG. 16. The input signal CK becomes substantially the same signal as the clock signal CK1 when the enable signal CEN is at a high level, and the input signal CK becomes a low level when the enable signal CEN is at a low level. The AND circuit 2201 operates as a clock gating cell and may pass or stop the clock signal by using the enable signal CEN.

Eighth Exemplary Implementation

Figure 24:
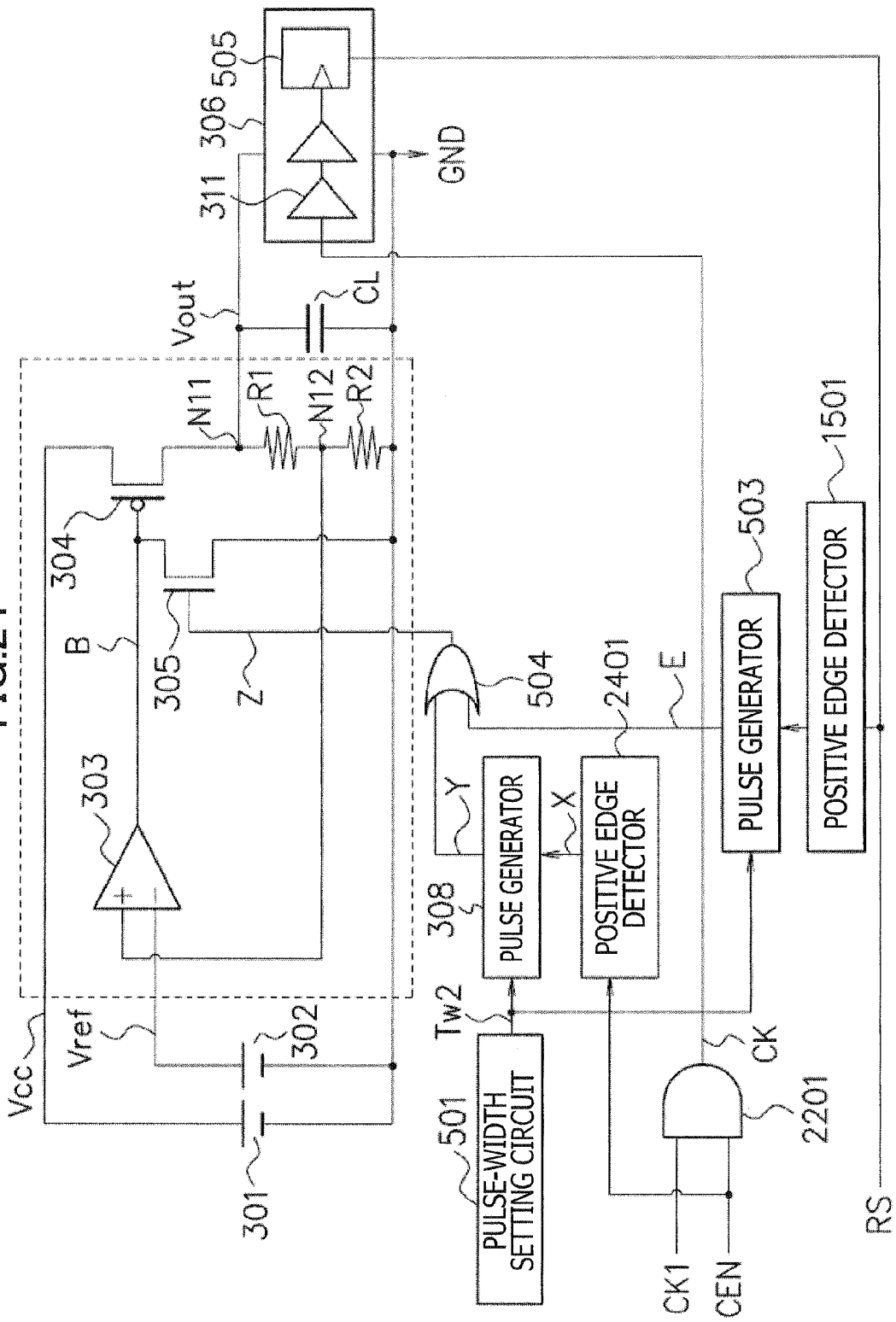
FIG. 24 is a diagram illustrating an example of a voltage regulator circuit according to an eighth exemplary implementation in accordance with aspects of the present invention.

FIG. 24 is a diagram illustrating an example of the configuration of a voltage regulator circuit according to an eighth exemplary implementation in accordance with aspects of the present invention. FIG. 25 is a timing chart illustrating an example of the operation of the voltage regulator circuit illustrated in FIG. 24. This exemplary implementation (FIG. 24) is obtained by providing a positive edge detector 2401, instead of the clock pulse detecting circuit 1502, in the seventh exemplary implementation (FIG. 22). Hereinafter, the points that the eighth exemplary implementation is different from the seventh exemplary implementation will be described. The positive edge detector 2401 includes, as illustrated in FIG. 23, the inverter 702 and the AND circuit 703. The positive edge detector 2401 detects the positive edge of the enable signal CEN, and outputs the pulse X to the pulse generator 308. In order to pass the clock signal CK1 when the enable signal CEN is at a low level, a negative edge detector may be provided instead of the positive edge detector 2401.

Ninth Exemplary Implementation

Figure 26:
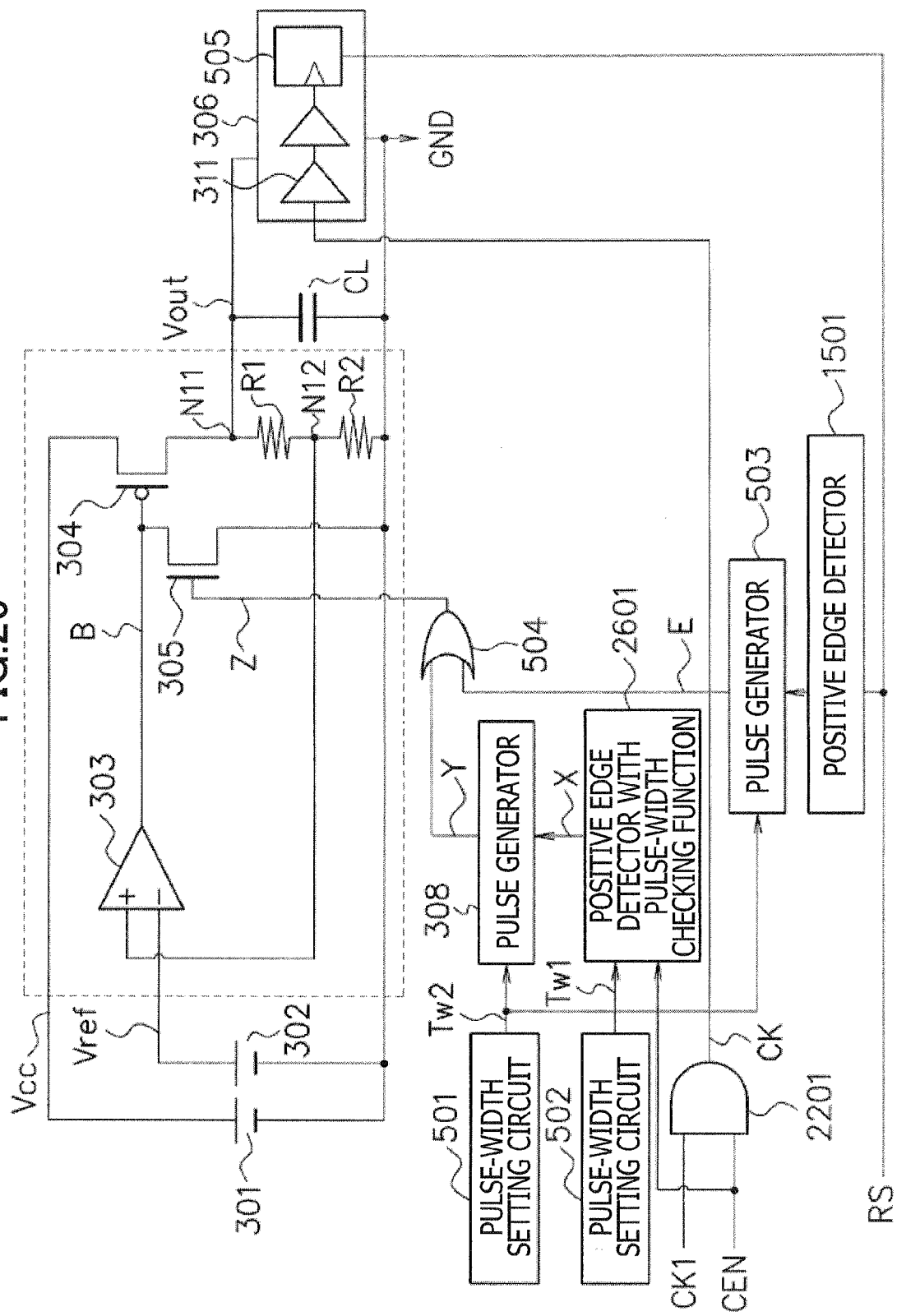
FIG. 26 is a diagram illustrating an example of a voltage regulator circuit according to a ninth exemplary implementation in accordance with aspects of the present invention.
Figure 27:
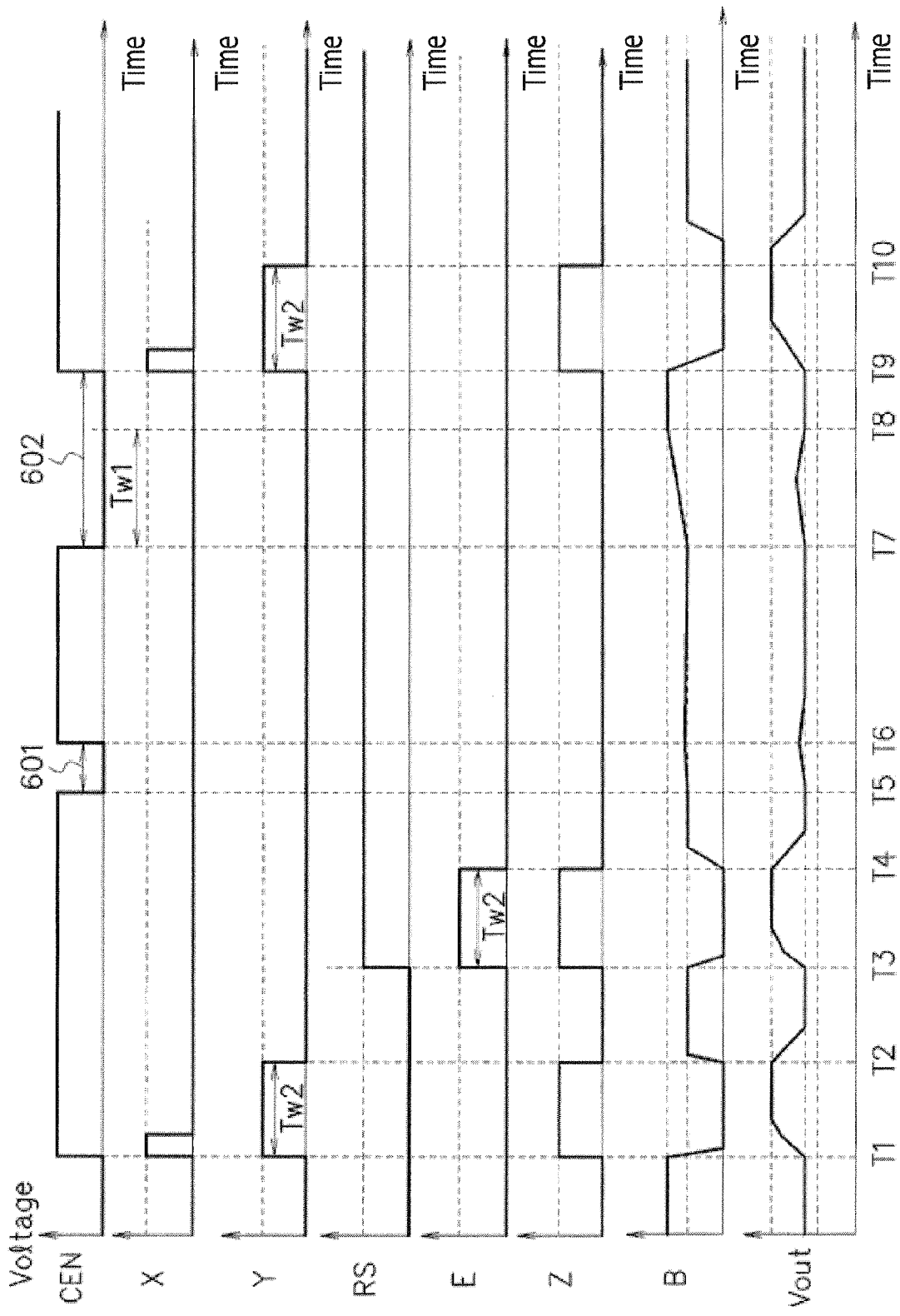
FIG. 27 is a timing chart illustrating an example of the operation of the voltage regulator circuit illustrated in FIG. 26 in accordance with aspects of the present invention.

FIG. 26 is a diagram illustrating an example of the configuration of a voltage regulator circuit according to a ninth exemplary implementation in accordance with aspects of the present invention. FIG. 27 is a timing chart illustrating an example of the operation of the voltage regulator circuit illustrated in FIG. 26. This exemplary implementation (FIG. 26) is obtained by providing a positive edge detector 2601 with a pulse-width check function, instead of the positive edge detector 2401, in the eighth exemplary implementation (FIG. 24). Hereinafter, the points that the ninth exemplary implementation is different from the eighth exemplary implementation will be described. FIG. 27 corresponds to FIG. 16. The input signal CK becomes substantially the same as the clock signal CK1 when the enable signal CEN is at a high level, and the input signal CK is at a low level when the enable signal CEN is at a low level. The positive edge detector 2601 outputs the one-shot pulse X when the positive edge detector 2601 detects the positive edge of the enable signal CEN after the clock stopped period 602 that is longer than the pulse width Tw1. In contrast, the positive edge detector 2601 maintains the pulse X at a low level when the positive edge detector 2601 detects the positive edge of the enable signal CEN after the clock stopped period 601 that is shorter than the pulse width Tw1.

Figure 28:
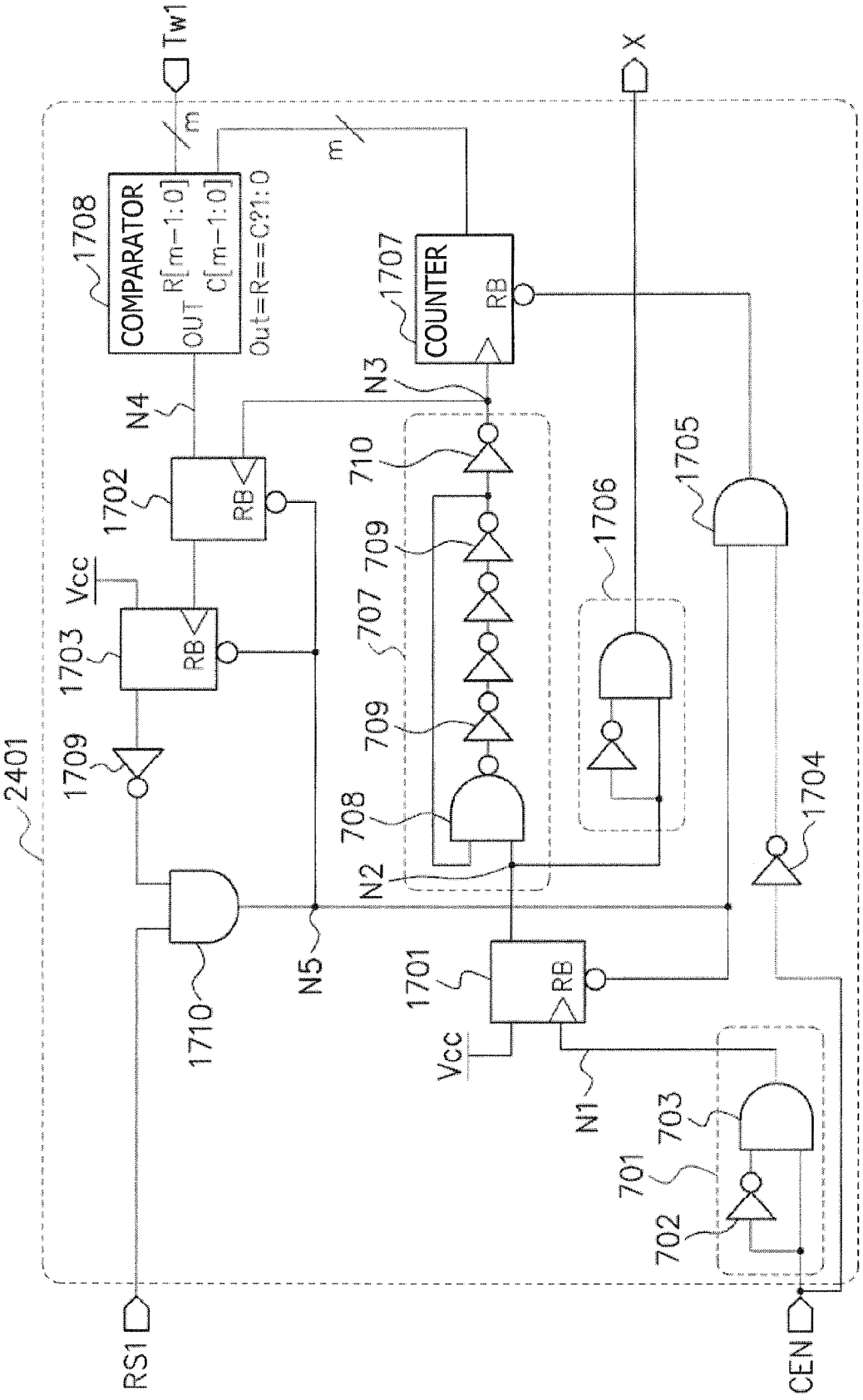
FIG. 28 is a diagram illustrating an example of a positive edge detector illustrated in FIG. 26 in accordance with aspects of the present invention.
Figure 29:
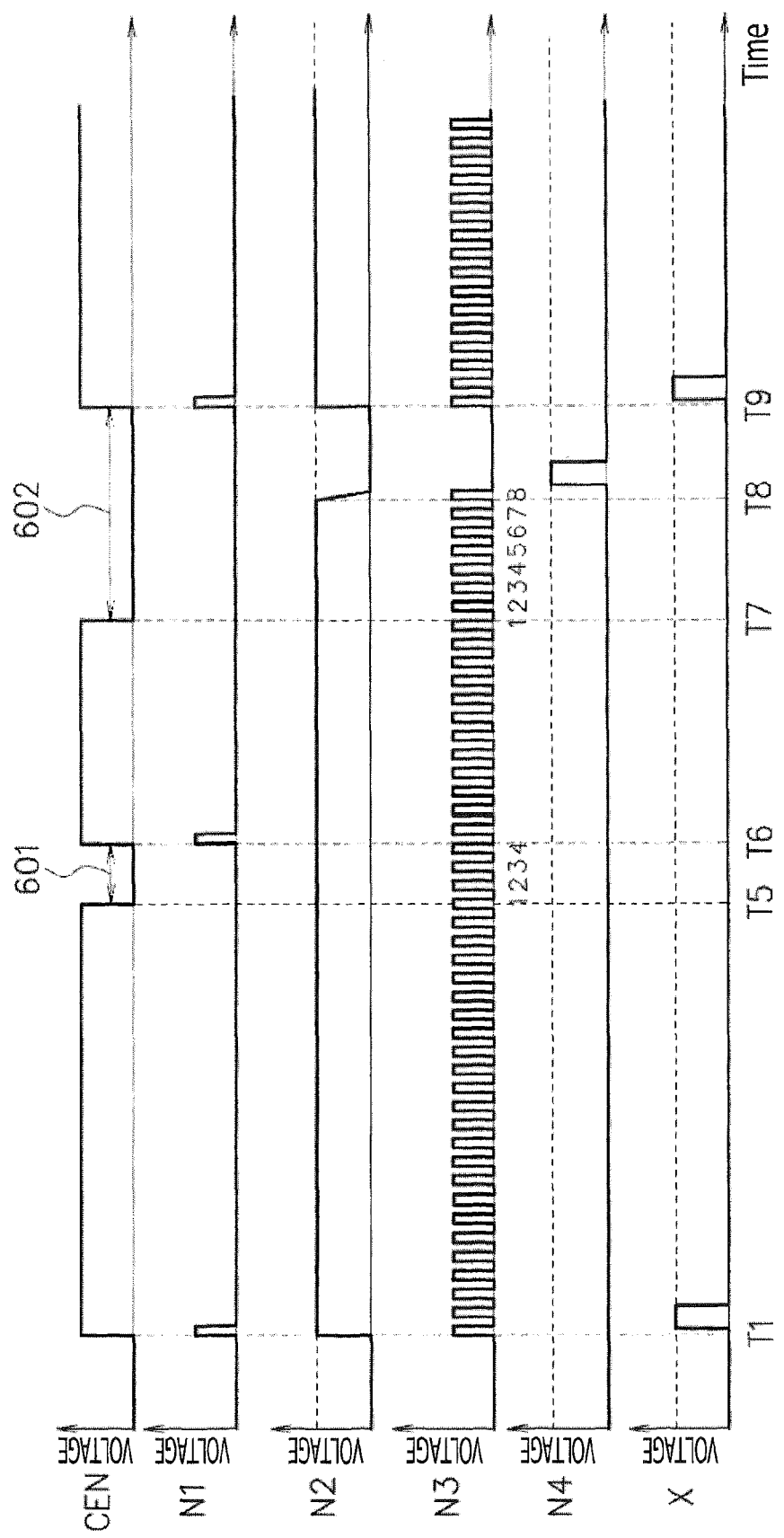
FIG. 29 is a timing chart illustrating an example of the operation of the positive edge detector illustrated in FIG. 28 in accordance with aspects of the present invention.

FIG. 28 is a diagram illustrating an example of the configuration of the positive edge detector 2601 illustrated in FIG. 26. FIG. 29 is a timing chart illustrating an example of the operation of the positive edge detector 2601 illustrated in FIG. 28. Hereinafter, the points that the configuration of the positive edge detector 2601 illustrated in FIG. 28 is different from the configuration of the clock pulse detecting circuit 1502 illustrated in FIG. 17 will be described. The enable signal CEN is input to the positive edge detector 701. The inverter 1704 outputs a logic-inverted signal of the enable signal CEN. The AND circuit 1705 outputs an AND signal of an output signal of the inverter 1704 and the signal N5 to the reset bar terminal RB of the counter 1707. The enable signal CEN is at a low level in the clock stopped period 601 that is shorter than the pulse width Tw1. The pulse X maintains a low level even when the enable signal CEN rises at time T6. In contrast, the enable signal CEN is at a low level in the clock stopped period 602 that is longer than the pulse width Tw1.

The pulse X becomes a one-shot pulse when the enable signal CEN rises at time T9. The pulse width Tw1 is, for example, 8.

Tenth Exemplary Implementation

Figure 30:
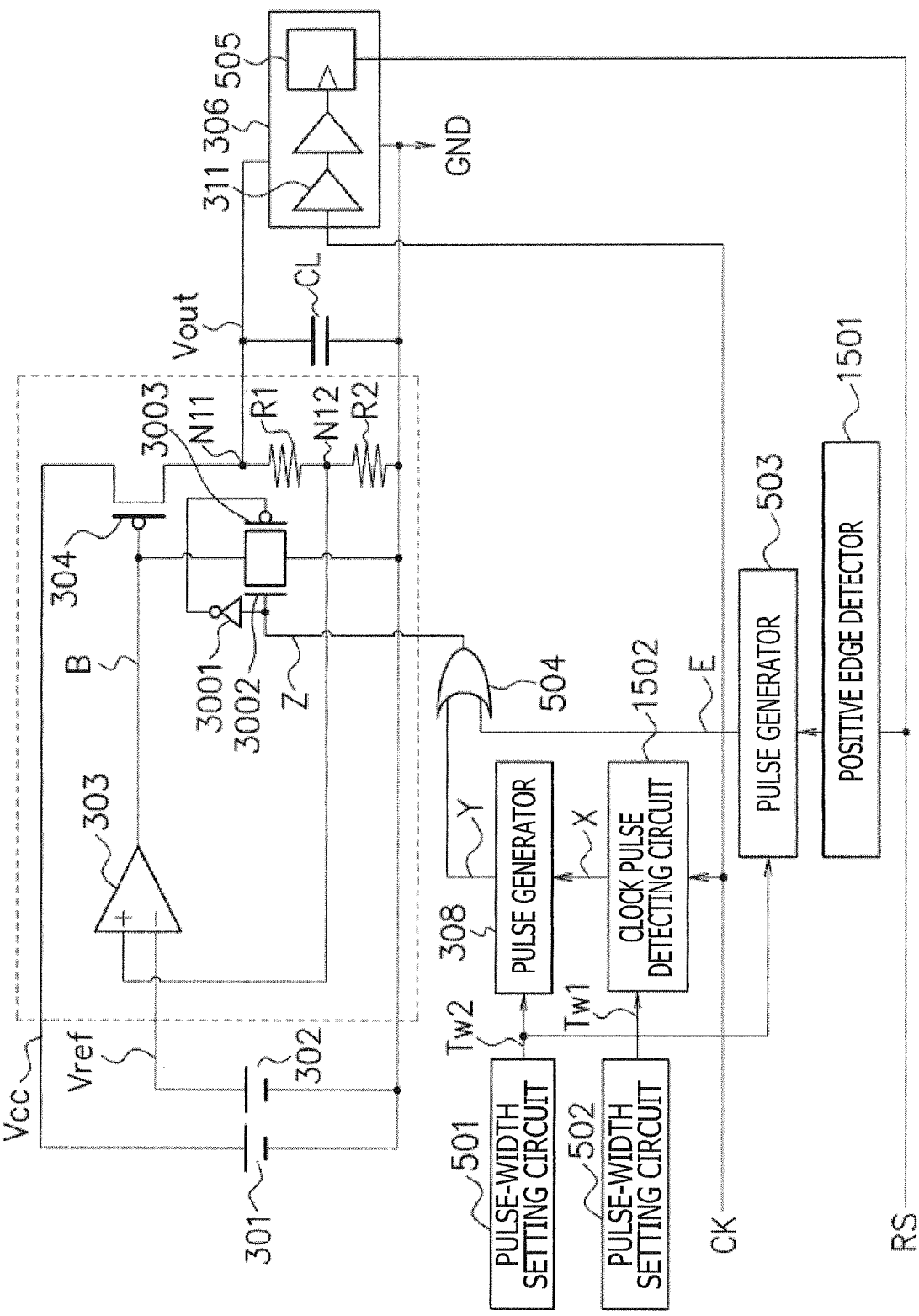
FIG. 30 is a diagram illustrating an example of a voltage regulator circuit according to a tenth exemplary implementation in accordance with aspects of the present invention.

FIG. 30 is a diagram illustrating an example of the configuration of a voltage regulator circuit according to a tenth exemplary implementation in accordance with aspects of the present invention. This exemplary implementation (FIG. 30) is obtained by providing FETs 3002 and 3003 and an inverter 3001, instead of the n-channel FET 305, in the fifth exemplary implementation (FIG. 15). Hereinafter, the points that the tenth exemplary implementation is different from the fifth exemplary implementation will be described. The inverter 3001 outputs a logic-inverted signal of the pulse Z. The gate of the n-channel FET 3002 is connected to the node of the pulse Z. The source of the n-channel FET 3002 is connected to the node at the reference potential GND. The drain of the n-channel FET 3002 is connected to the gate of the p-channel FET 304. The gate of the p-channel FET 3003 is connected to an output terminal of the inverter 3001. The source of the p-channel FET 3003 is connected to the gate of the p-channel FET 304. The drain of the p-channel FET 3003 is connected to the node at the reference potential GND. The FETs 3002 and 3003 constitute a complementary metal oxide semiconductor (CMOS) transfer gate (first switch) and has substantially the same function as that of the n-channel FET 305 illustrated in FIG. 15. The operation of the tenth exemplary implementation is substantially the same as that of the fifth exemplary implementation.

Eleventh Exemplary Implementation

Figure 31:
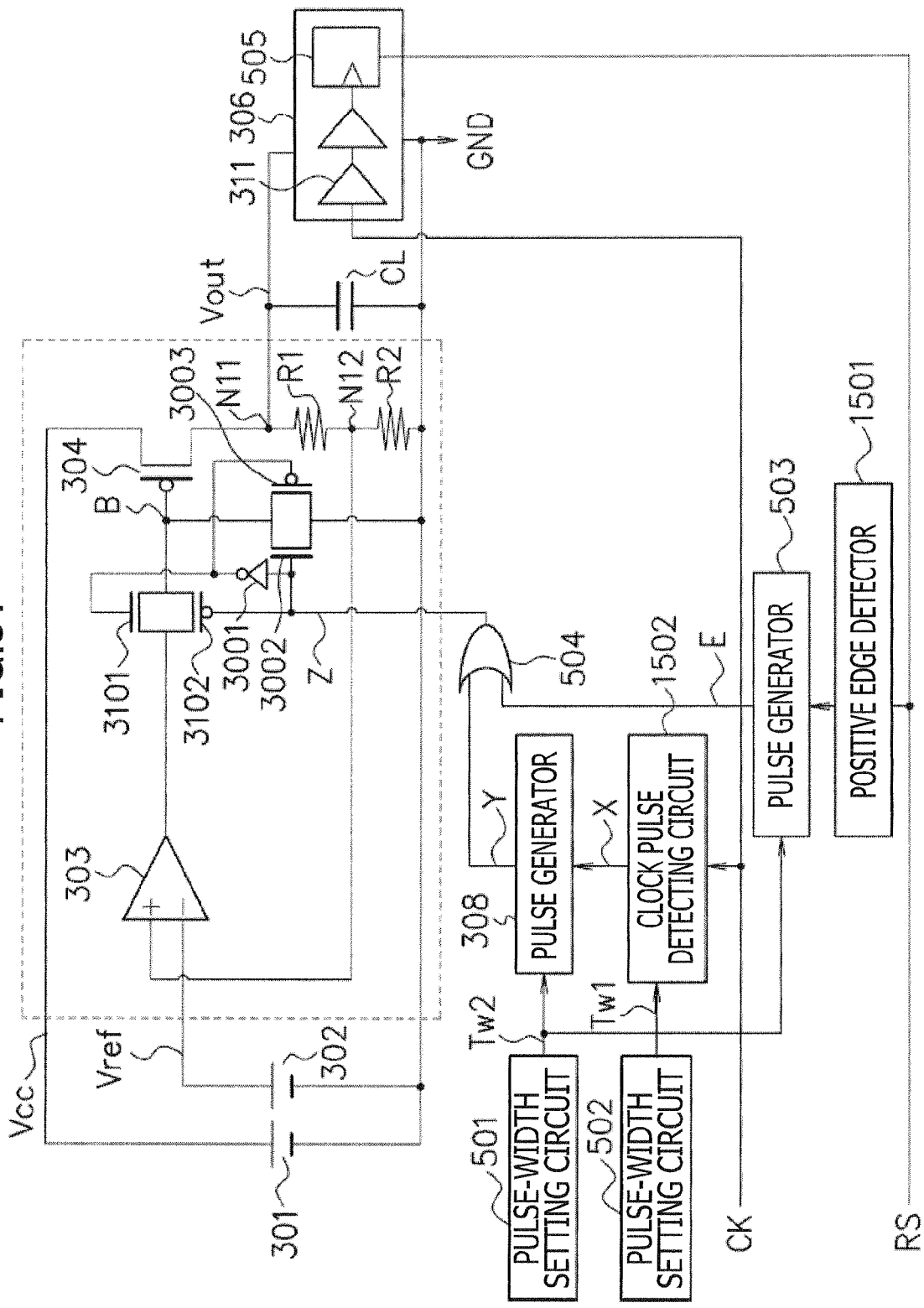
FIG. 31 is a diagram illustrating an example of a voltage regulator circuit according to an eleventh exemplary implementation in accordance with aspects of the present invention.

FIG. 31 is a diagram illustrating an example of the configuration of a voltage regulator circuit according to an eleventh exemplary implementation in accordance with aspects of the present invention. This exemplary implementation (FIG. 31) is obtained by adding FETs 3101 and 3102 to the tenth exemplary implementation (FIG. 30). Hereinafter, the points that the eleventh exemplary implementation is different from the tenth exemplary implementation will be described. The gate of the n-channel FET 3101 is connected to the output terminal of the inverter 3001. The drain of the n-channel FET 3101 is connected to the output terminal of the error amplifier 303. The source of the n-channel FET 3101 is connected to the gate of the p-channel FET 304. The gate of the p-channel FET 3102 is connected to the node of the pulse Z. The source of the p-channel FET 3102 is connected to the output terminal of the error amplifier 303. The drain of the p-channel FET 3102 is connected to the gate of the p-channel FET 304. The FETs 3101 and 3102 constitute a CMOS transfer gate. The CMOS transfer gate (second switch) 3101 and 3102 cuts off connection between the output terminal of the error amplifier 303 and the gate of the n-channel FET 304 by using the pulse Z as a control signal.

As illustrated in FIG. 30, when the gate of the p-channel FET 304 is connected to the node at the reference potential GND in a state where the output terminal of the error amplifier 303 is connected to the gate of the p-channel FET 304, unnecessary through current flows from the error amplifier 303, resulting in power loss. In the eleventh exemplary implementation, when the FETs 3002 and 3003 are turned ON and the gate of the p-channel FET 304 is connected to the node at the reference potential GND, the gate of the p-channel FET 304 is disconnected from the output terminal of the error amplifier 303 by turning OFF the FETs 3101 and 3102. Accordingly, unnecessary through current from the error amplifier 303 may be avoided, and power loss may be avoided.

Twelfth Exemplary Implementation

Figure 32:
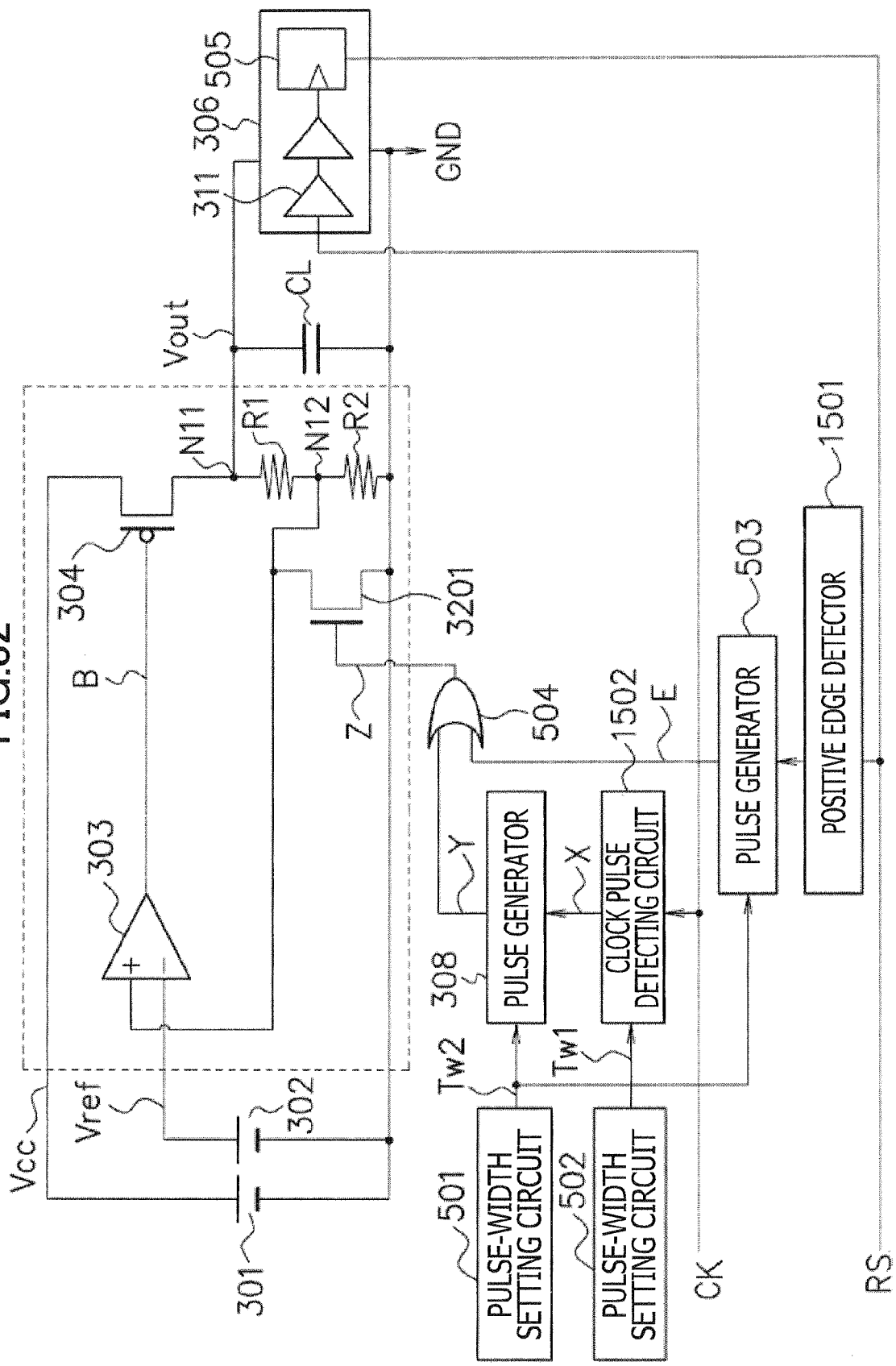
FIG. 32 is a diagram illustrating an example of a voltage regulator circuit according to a twelfth exemplary implementation in accordance with aspects of the present invention.

FIG. 32 is a diagram illustrating an example of the configuration of a voltage regulator circuit according to a twelfth exemplary implementation in accordance with aspects of the present invention. This exemplary implementation (FIG. 32) is obtained by providing an n-channel FET (first switch) 3201, instead of the n-channel FET 305, in the fifth exemplary implementation (FIG. 15). Hereinafter, the points that the twelfth exemplary implementation is different from the fifth exemplary implementation will be described. The gate of the n-channel FET 3201 is connected to the output terminal of the OR circuit 504. The source of the n-channel FET 3201 is connected to the node at the reference potential GND. The drain of the n-channel FET 3201 is connected to the node N12. The n-channel FET 3201 is turned ON when the pulse Z becomes a high level, and the potential at the positive input terminal of the error amplifier 303 becomes the reference potential GND, thus causing the pulse B to become a low level. In contrast, the n-channel FET 3201 is turned OFF when the pulse Z becomes a low level. The error amplifier 303 outputs a high level when the voltage level of the positive input terminal is higher than the voltage level of the negative input terminal, and outputs a low level when the voltage level of the positive input terminal is lower than the voltage level of the negative input terminal. Thus, the output terminal of the error amplifier 303 drops to a low level when the positive input terminal of the error amplifier 303 drops to a low level. The n-channel FET 3201 forces the potential at the gate of the n-channel FET 304 to become the reference potential (first potential) GND by using the pulse Z as a control signal. Accordingly, the operation of the twelfth exemplary implementation may be substantially the same as that of the fifth exemplary implementation.

In the first to twelfth exemplary implementations, the case where the second FETs 305 and 3201 are n-channel FETs, and the first FET 304 is a p-channel FET has been described. However, it is clear that the second FETs 305 and 3201 become p-channel FETs when the first FET 304 is an n-channel FET.

As above, the voltage regulator circuits of the first to twelfth exemplary implementations may increase the drain voltage Vout of the first FET 304 typically at the start of the inputting of the clock signal when the clock signal is input as the input signal CK. Thus, useless power consumption may be avoided, and a stable power supply potential may be supplied.

The foregoing exemplary implementations are simply illustrating specific examples of implementations in accordance with aspects of the present invention, and the technical scope of the present invention shall not be interpreted in a limited sense based on these exemplary implementations. That is, the present invention may be embodied in various forms, without departing from the technical spirit or the features of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although aspects of the present inventions have been described in detail, it should be understood that the various changes, substitutions, and alterations could be made hereto without departing from the spirit and scope of the invention.

The invention claimed is:

1. A voltage regulator circuit comprising:
a first pulse generator configured to output a pulse whose level remains unchanged when an input signal of a first circuit is in a first period, and whose level changes from a second level to a first level when an edge of the input signal of the first circuit is detected after the first period;
a second pulse generator configured to output a pulse from a time that the pulse output by the first pulse generator becomes the first level until a second period elapses;
a first field-effect transistor having a source connected to a power supply potential node, and a drain connected to a power supply potential terminal of the first circuit;
a first switch configured to cause a potential at a gate of the first field-effect transistor to be a first potential, based on the pulse output by the second pulse generator, the pulse serving as a control signal; and
a third pulse generator configured to output a pulse from a time that a reset signal of the first circuit changes until a third period elapses,
wherein the first switch forces the potential at the gate of the first field-effect transistor to be the first potential, using the pulse output by the second pulse generator and the pulse output by the third pulse generator as control signals.

2. The voltage regulator circuit according to claim 1, wherein the first pulse generator maintains the pulse at the first level when the edge of the input signal of the first circuit is detected, and wherein the first pulse generator maintains the pulse at the second level when the edge of the input signal of the first circuit is not detected within the first period after the edge of the input signal of the first circuit is detected.

3. The voltage regulator circuit according to claim 1, wherein the first switch connects the gate of the first field-effect transistor to a node at the first potential, using the pulse output by the second pulse generator as a control signal.

4. The voltage regulator circuit according to claim 1, wherein the first switch includes a second field-effect transistor having a gate to which the pulse output by the second pulse generator is input, and a source connected to a node at the first potential, and wherein the gate of the first field-effect transistor is connected to a drain of the second field-effect transistor.

5. The voltage regulator circuit according to claim 4, wherein the second field-effect transistor is an n-channel field-effect transistor, and the source of the second field-effect transistor is connected to the reference potential node, wherein the first field-effect transistor is a p-channel field-effect transistor, and wherein the second pulse generator outputs a pulse at a high level to the gate of the second field-effect transistor from the time that the pulse output by the first pulse generator becomes the first level until the second period elapses.

6. The voltage regulator circuit according to claim 1, further comprising an error amplifier configured to output a differential voltage between a reference voltage and one of a drain voltage of the first field-effect transistor and a voltage in accordance with the drain voltage to the gate of the first field-effect transistor.

7. The voltage regulator circuit according to claim 6, further comprising a resistor configured to resistance-divide a drain voltage of the first field-effect transistor, wherein the error amplifier outputs a differential voltage between a voltage obtained by the resistance division performed by the resistor and the reference voltage to the gate of the first field-effect transistor.

8. The voltage regulator circuit according to claim 7, wherein the first switch connects a node at the voltage obtained by the resistance division performed by the resistor to a node at the first potential, using the pulse output by the second pulse generator as a control signal.

9. The voltage regulator circuit according to claim 6, further comprising a second switch configured to cut off connection between an output terminal of the error amplifier and the gate of the first field-effect transistor, using the pulse output by the second pulse generator as a control signal, wherein the first switch connects the gate of the first field-effect transistor to a node at the first potential, using the pulse output by the second pulse generator as a control signal.

10. The voltage regulator circuit according to claim 1, wherein the second pulse generator outputs the pulse from the time that the pulse output by the first pulse generator becomes the first level until the second period elapses based on a counter.

11. The voltage regulator circuit according to claim 1, wherein the second pulse generator outputs the pulse from the time that the pulse output by the first pulse generator becomes the first level until a drain voltage of the first field-effect transistor exceeds a first voltage.

12. The voltage regulator circuit according to claim 1, wherein the third pulse generator outputs the pulse from the time that the reset signal of the first circuit changes until the third period elapses based on a counter.

13. The voltage regulator circuit according to claim 1, wherein the third pulse generator outputs the pulse from the time that the reset signal of the first circuit changes until a drain voltage of the first field-effect transistor exceeds a first voltage.

14. The voltage regulator circuit according to claim 1, wherein the first pulse generator includes a counter that counts the first period.

15. A voltage regulator circuit comprising:
a first pulse generator configured to output a pulse whose level remains unchanged when an input signal of a first circuit is in a first period, and whose level changes from a second level to a first level when an edge of the input signal of the first circuit is detected after the first period;
a second pulse generator configured to output a pulse from a time that the pulse output by the first pulse generator becomes the first level until a second period elapses;
a first field-effect transistor having a source connected to a power supply potential node, and a drain connected to a power supply potential terminal of the first circuit;
a first switch configured to cause a potential at a gate of the first field-effect transistor to be a first potential, based on the pulse output by the second pulse generator, the pulse serving as a control signal;
a plurality of the first pulse generators configured to individually detect edges of input signals of a plurality of the first circuits; and
an OR circuit configured to output an OR pulse based on pulses output by the plurality of the first pulse generators,
wherein the second pulse generator outputs the pulse from a time that the OR pulse output by the OR circuit becomes the first level until the second period elapses.

16. A voltage regulator circuit comprising:
a first pulse generator configured to output a pulse whose level remains unchanged when an input signal of a first circuit is in a first period, and whose level changes from a second level to a first level when an edge of the input signal of the first circuit is detected after the first period;
a second pulse generator configured to output a pulse from a time that the pulse output by the first pulse generator becomes the first level until a second period elapses;

a first field-effect transistor having a source connected to a power supply potential node, and a drain connected to a power supply potential terminal of the first circuit; and a first switch configured to cause a potential at a gate of the first field-effect transistor to be a first potential, based on the pulse output by the second pulse generator, the pulse serving as a control signal, wherein the first pulse generator includes a positive edge detector, a ring oscillator, a counter, a D-type flip-flop, and a comparator, and wherein the second pulse generator includes a ring oscillator, a counter, a D-type flip-flop, and a comparator.

17. A voltage regulator circuit comprising:

a first pulse generator configured to output a pulse whose level remains unchanged when an input signal of a first circuit is in a first period, and whose level changes from a second level to a first level when an edge of the input signal of the first circuit is detected after the first period;

a second pulse generator configured to output a pulse from a time that the pulse output by the first pulse generator becomes the first level until a second period elapses;

a first field-effect transistor having a source connected to a power supply potential node, and a drain connected to a power supply potential terminal of the first circuit;

a first switch configured to cause a potential at a gate of the first field-effect transistor to be a first potential, based on the pulse output by the second pulse generator, the pulse serving as a control signal; and an AND circuit configured to output an AND signal of a clock signal and an enable signal as the input signal of the first circuit, wherein the first pulse generator detects the edge of the input signal of the first circuit, based on the enable signal.

* * * * *